(12) United States Patent
Harayama et al.

(10) Patent No.: US 8,874,003 B2
(45) Date of Patent: Oct. 28, 2014

(54) SUPPORTING MECHANISM AND IMAGE FORMING APPARATUS

(71) Applicant: Fuji Xerox Co., Ltd., Tokyo (JP)

(72) Inventors: Yoshiyuki Harayama, Kanagawa (JP); Shinichi Ohba, Kanagawa (JP); Satoshi Ezawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 56 days.

(21) Appl. No.: 13/675,660

(22) Filed: Nov. 13, 2012

(65) Prior Publication Data
US 2013/0308981 A1 Nov. 21, 2013

(30) Foreign Application Priority Data

May 17, 2012 (JP) ................................ 2012-113358
May 18, 2012 (JP) ................................ 2012-114282

(51) Int. Cl.
*G03G 15/00* (2006.01)
*F16C 17/02* (2006.01)
(52) U.S. Cl.
CPC ................ *F16C 17/02* (2013.01); *G03G 15/00* (2013.01); *G03G 15/757* (2013.01)
USPC ........................................................ 399/167

(58) Field of Classification Search
USPC ........................................................ 399/167
See application file for complete search history.

(56) References Cited

U.S. PATENT DOCUMENTS

| 6,035,159 A * | 3/2000 | Azuma et al. ................. 399/111 |
| 6,351,620 B1 | 2/2002 | Miyabe et al. |
| 7,272,341 B2 * | 9/2007 | Jung et al. ..................... 399/111 |
| 8,010,011 B2 * | 8/2011 | Tsui et al. ..................... 399/110 |
| 2010/0272470 A1 * | 10/2010 | Tomatsu et al. ............... 399/167 |

FOREIGN PATENT DOCUMENTS

| JP | A-11-167335 | 6/1999 |
| JP | A-2000-132058 | 5/2000 |

* cited by examiner

*Primary Examiner* — G. M. Hyder
(74) *Attorney, Agent, or Firm* — Oliff PLC

(57) ABSTRACT

Disclosed is a supporting mechanism including a bearing support portion that supports a bearing and is open so that the bearing is removed in a first direction that crosses a rotating shaft that is supported by the bearing, a driving shaft coupling that transmits a driving force to the rotating shaft by being connected to a rotating shaft coupling that is provided at one end of the rotating shaft, and a contact member that includes a bearing contact portion that makes contact with the bearing.

15 Claims, 27 Drawing Sheets

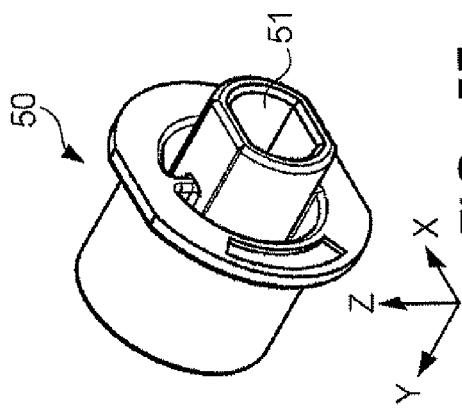
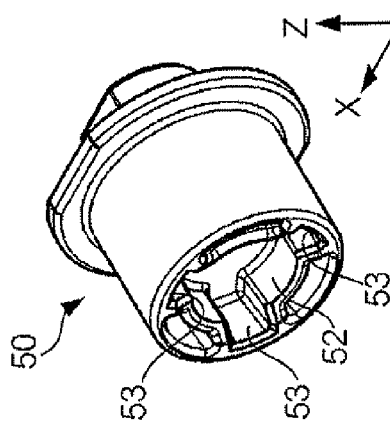
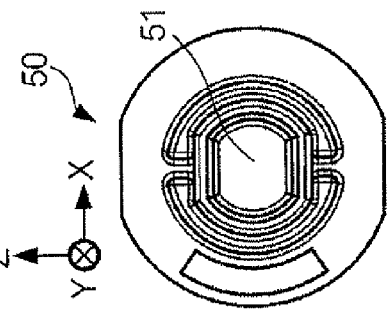
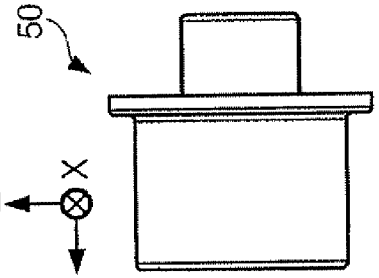
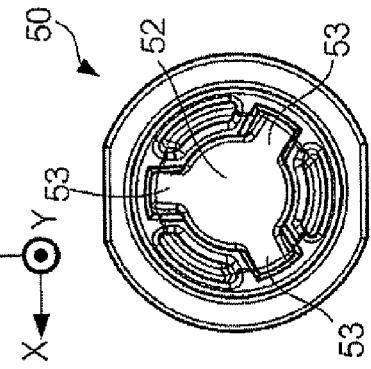

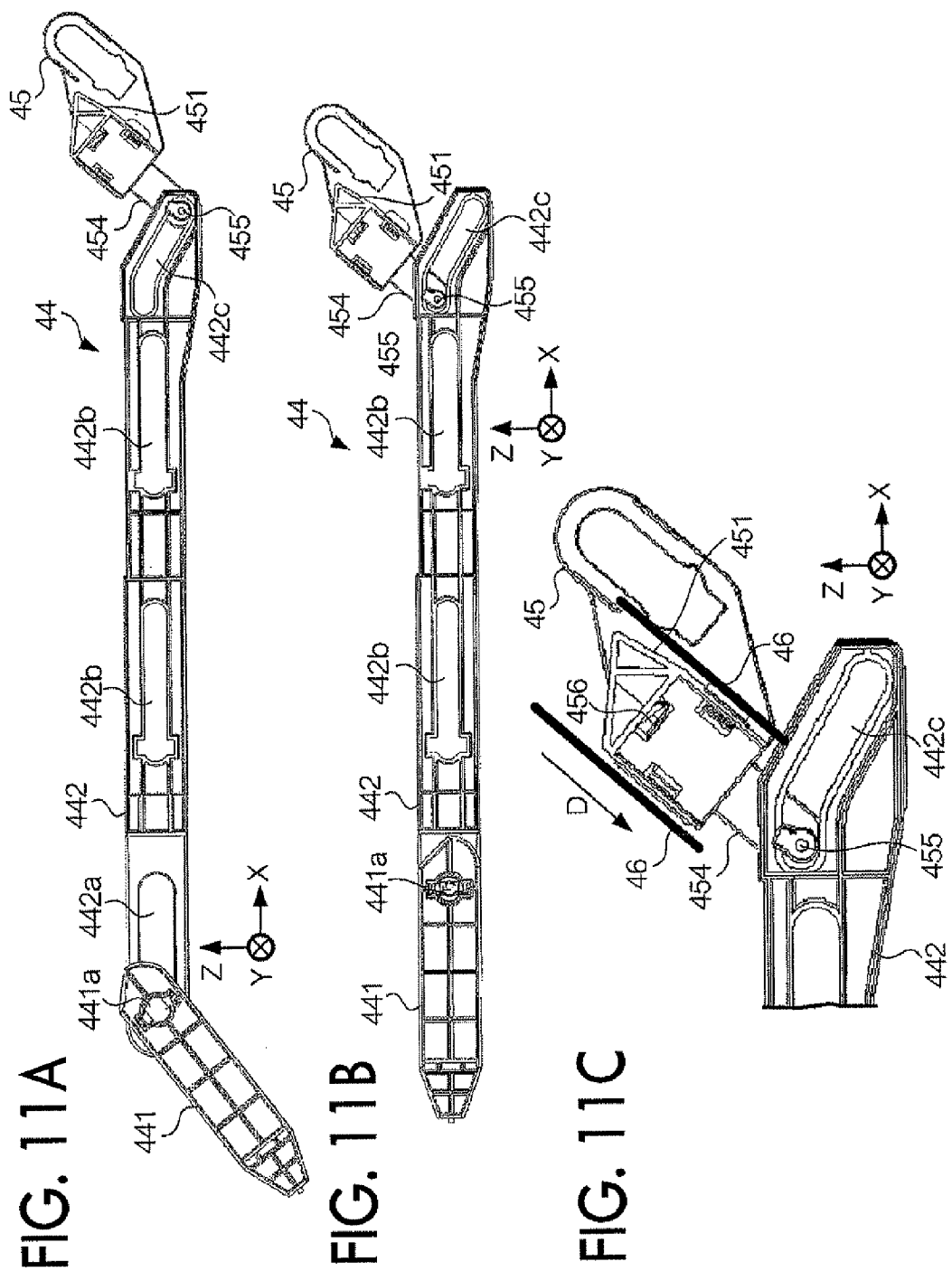

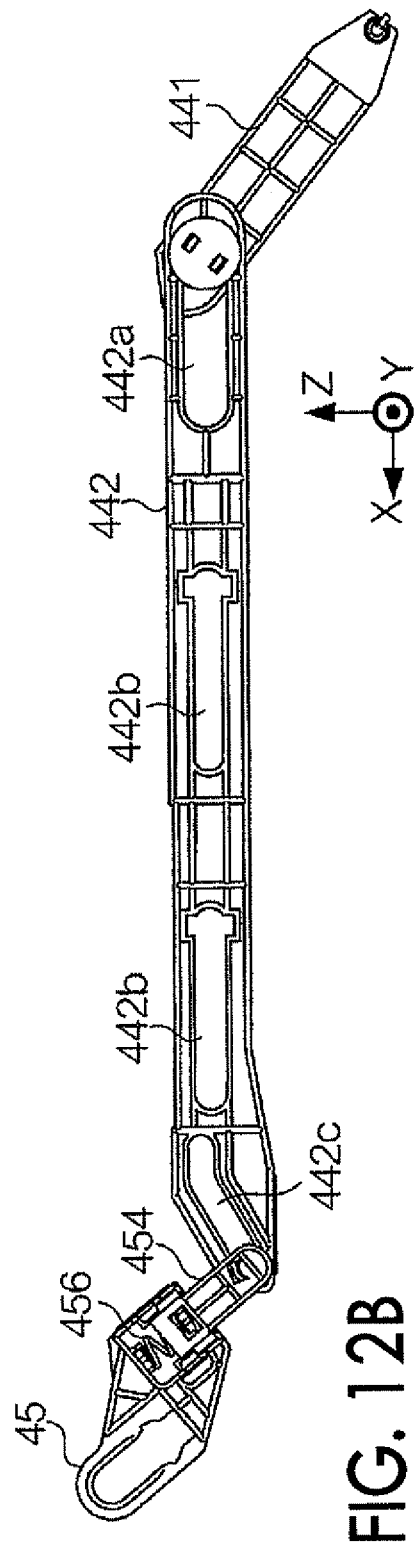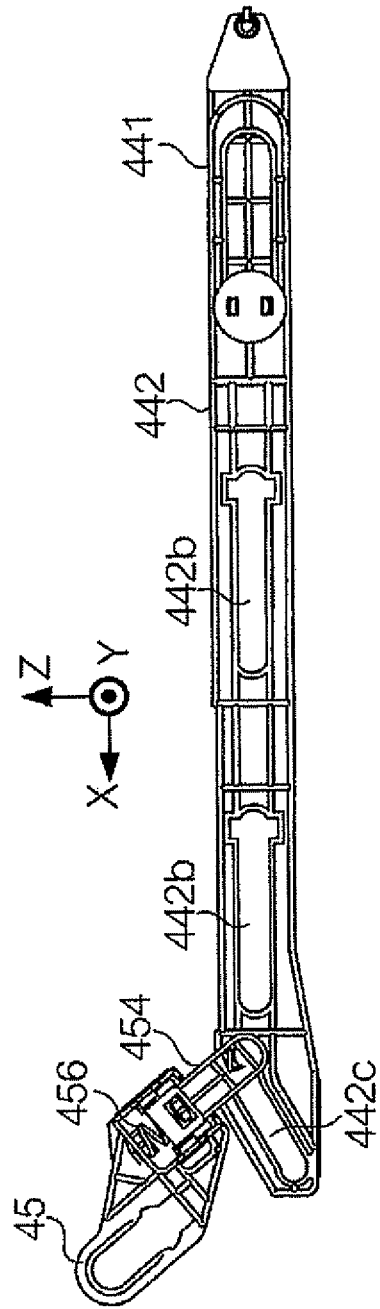

FIG. 13A
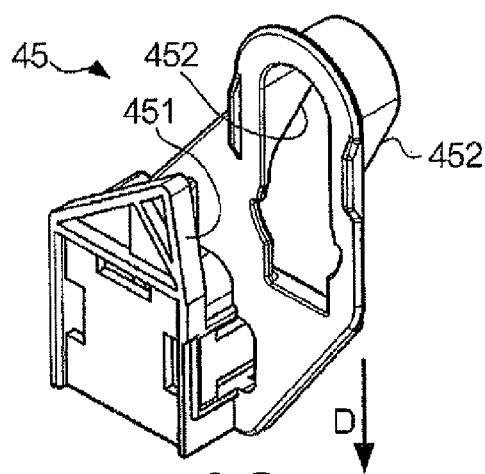
FIG. 13B
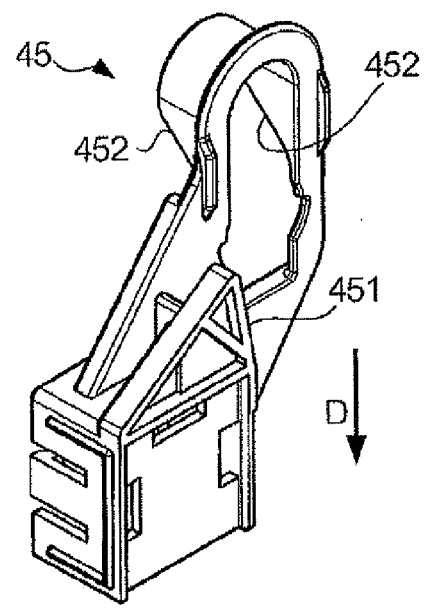
FIG. 13C
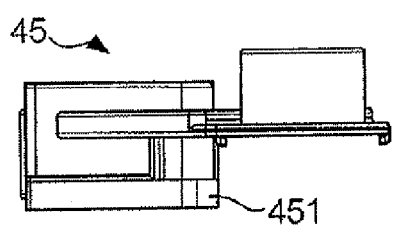
FIG. 13D
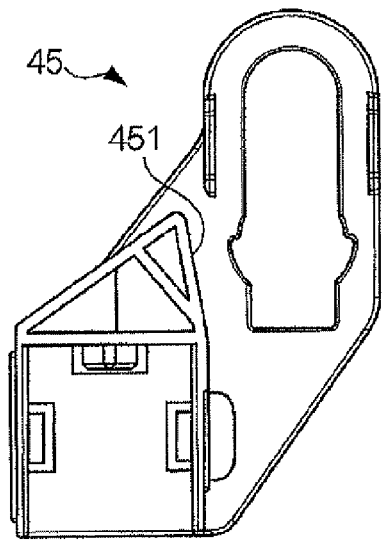
FIG. 13E

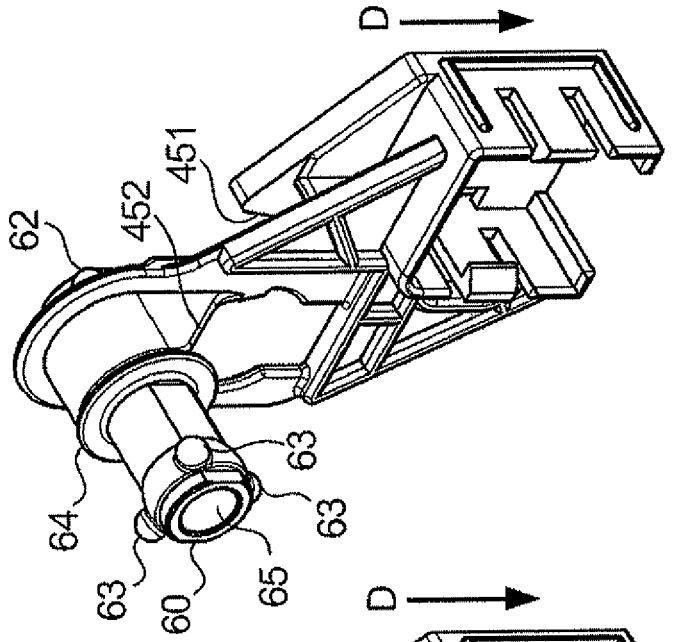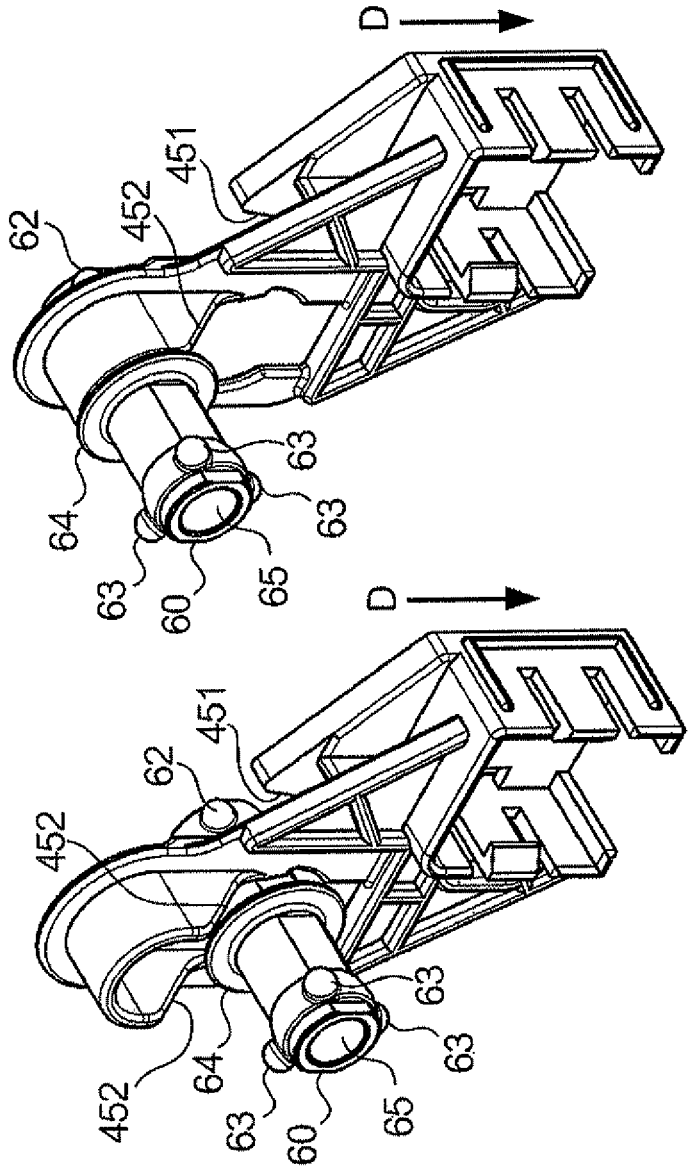

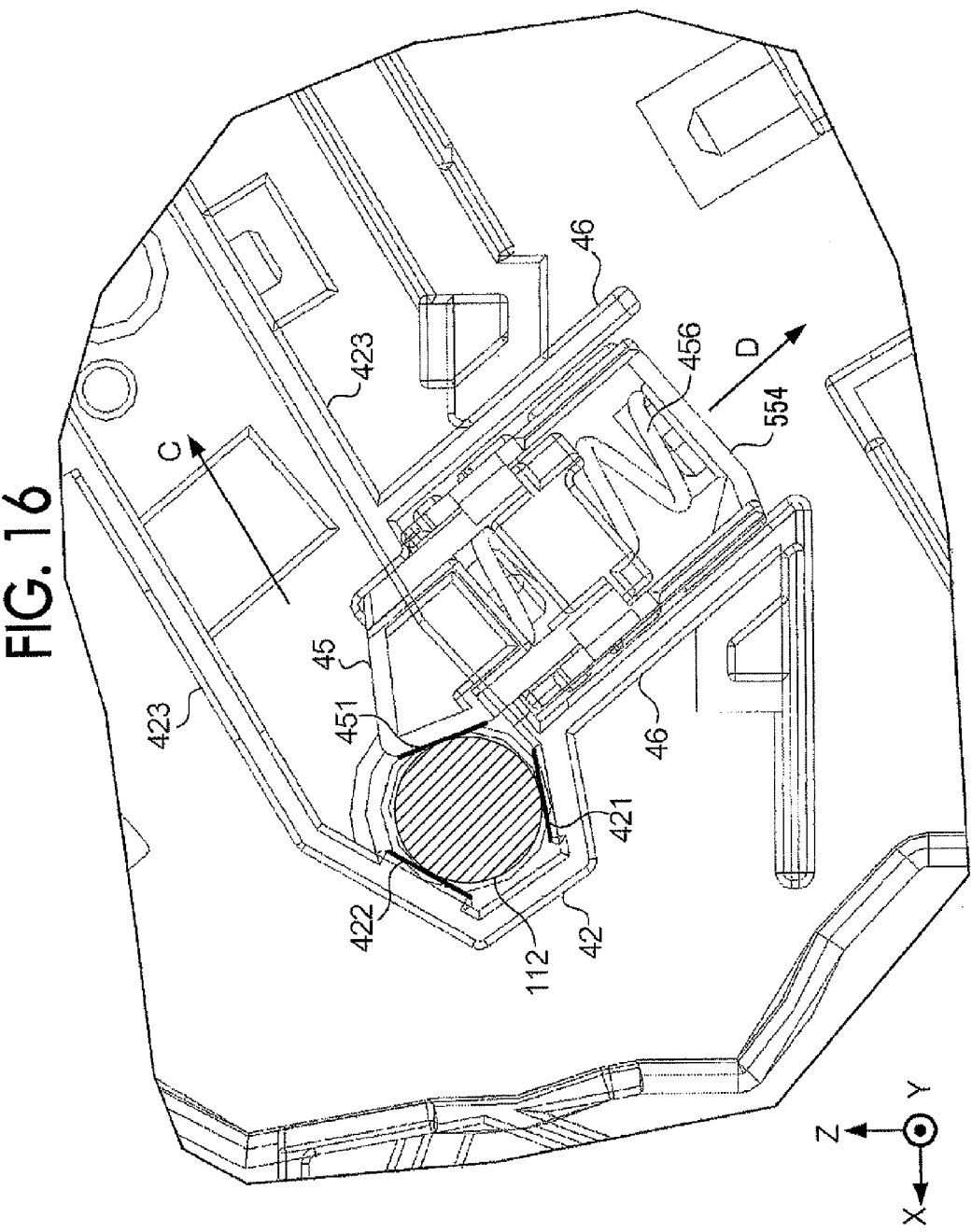

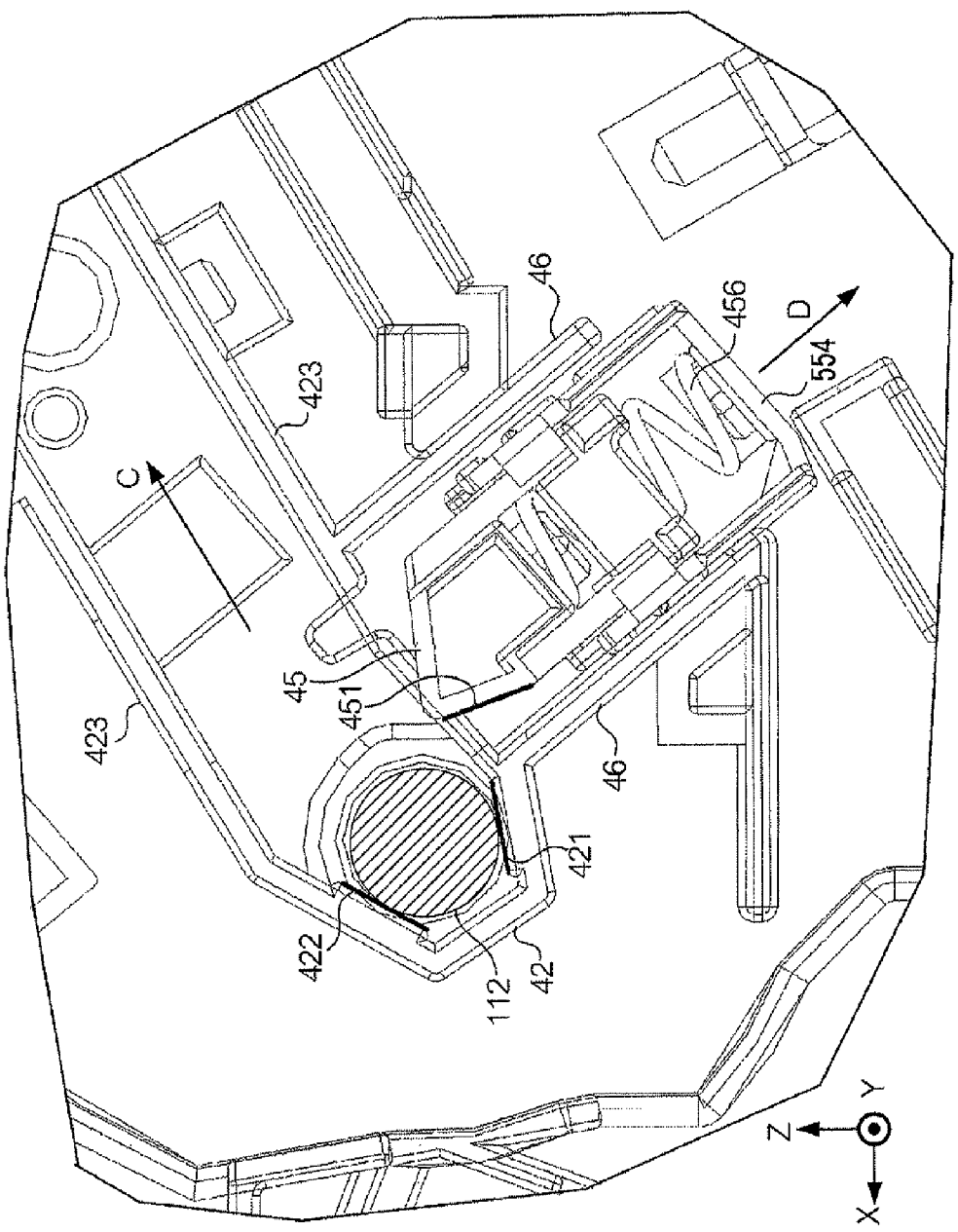

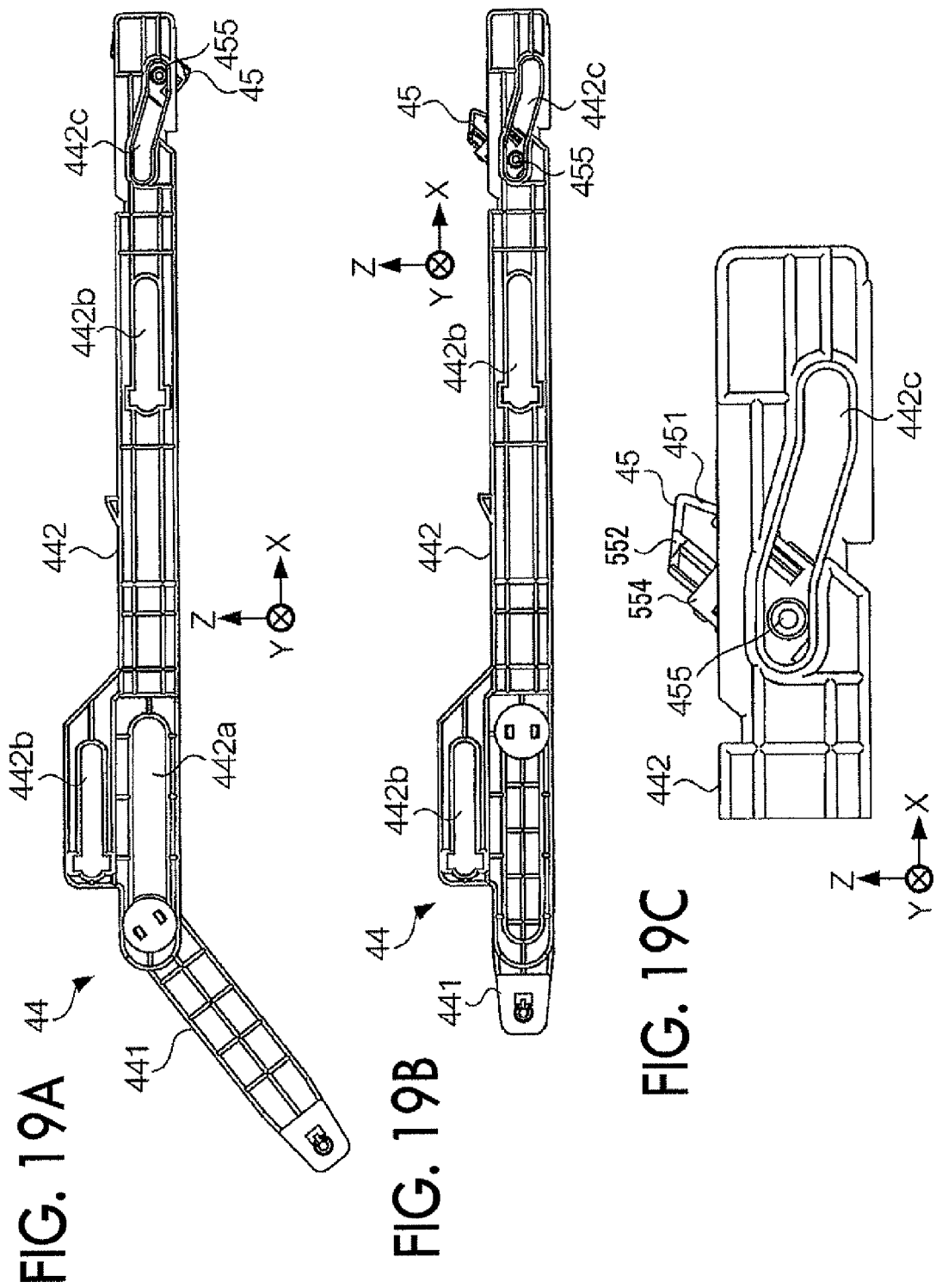

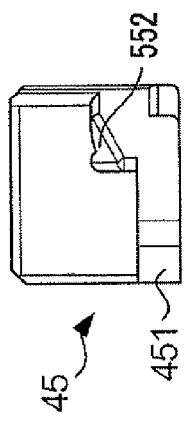
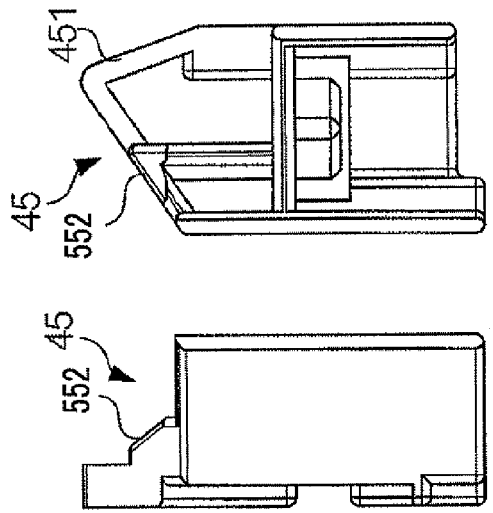
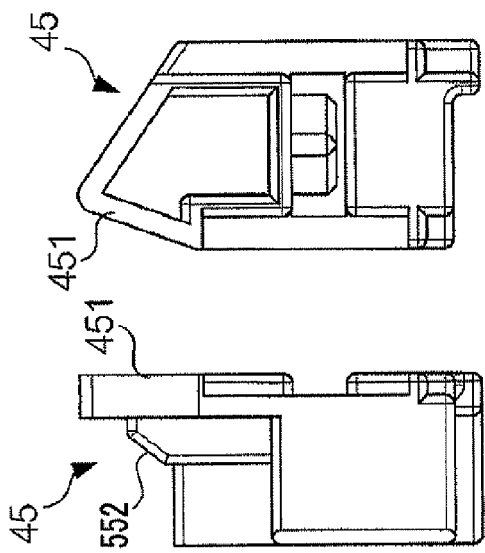

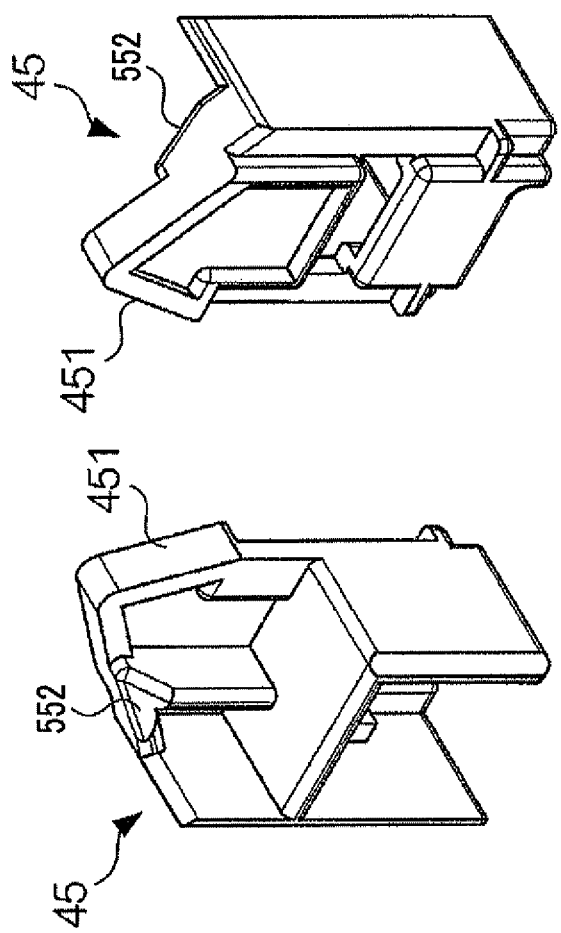

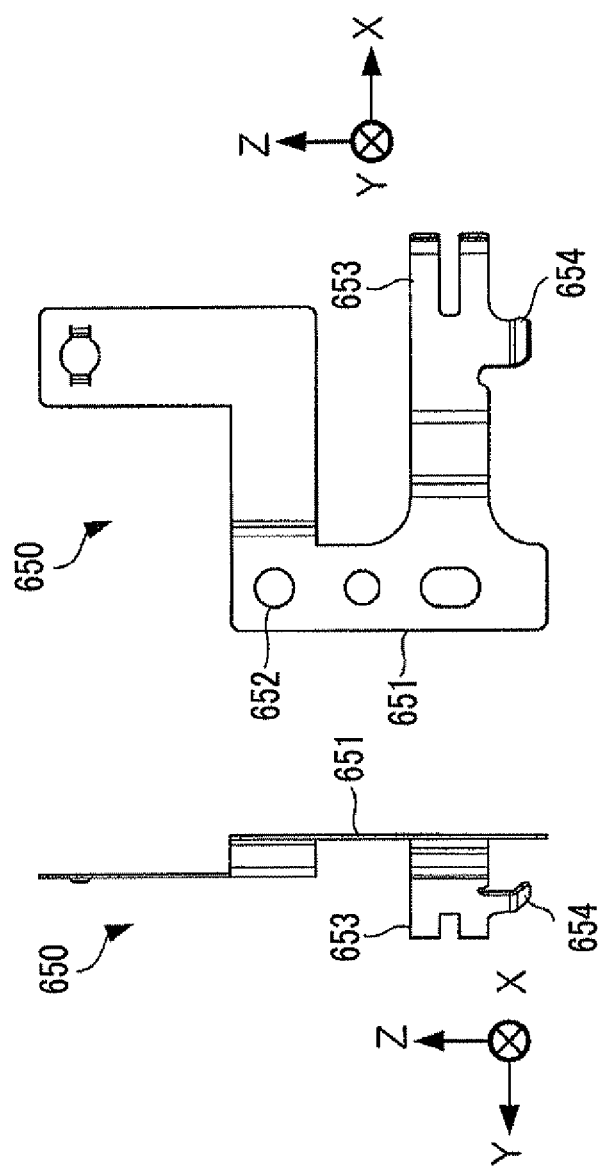

SUPPORTING MECHANISM AND IMAGE FORMING APPARATUS

CROSS-REFERENCE TO RELATED APPLICATIONS

This application is based on and claims priority under 35 USC 119 from Japanese Patent Application Nos. 2012-113358 filed May 17, 2012 and 2012-114282 filed May 18, 2012.

BACKGROUND (i) Technical Field

The invention relates to a supporting mechanism and an image forming apparatus.

(ii) Related Art

In an electrophotographic image forming apparatus, a technique of transmitting a driving force to a photoreceptor drum using a shaft coupling is known.

SUMMARY

According to an aspect of the invention, there is provided a supporting mechanism including: a bearing support portion that supports a bearing and is open so that the bearing is removed in a first direction that crosses a rotating shaft that is supported by the bearing; a driving shaft coupling that transmits a driving force to the rotating shaft by being connected to a rotating shaft coupling that is provided at one end of the rotating shaft; and a contact member that includes a bearing contact portion that makes contact with the bearing, wherein the bearing contact portion makes contact with the bearing so as to restrict movement of the bearing in the first direction when the contact member is positioned at a first position, and is separated from the bearing so as not to restrict the movement of the bearing in the first direction when the contact member is moved from the first position in a second direction that crosses the rotating shaft, and the driving shaft coupling is pushed out toward the rotating shaft coupling so as to be connected to the rotating shaft coupling when the contact member is positioned at the first position, and is pulled back so as to be separated from the rotating shaft coupling when the contact member is moved from the first position in the second direction.

BRIEF DESCRIPTION OF THE DRAWINGS

Exemplary embodiments of the present invention will be described in detail based on the following figures, wherein:

FIGS. 5A to 5E are views illustrating a rotating shaft coupling;

FIGS. 11A to 11C are right side views of a link mechanism;

FIGS. 12A and 12B are left side views of the link mechanism;

FIGS. 13A to 13E are views illustrating a contact member;

FIGS. 14A and 14B are views illustrating a positional relationship between the contact member and the driving shaft coupling;

FIG. 16 is a left side view of the image forming apparatus;

FIG. 17 is a left side view of the image forming apparatus;

FIGS. 19A to 19C are right side views of the link mechanism;

FIGS. 20A to 20G are views illustrating the contact member;

FIGS. 21A to 21E are views illustrating a ground electrode;

DETAILED DESCRIPTION

Figure 1:
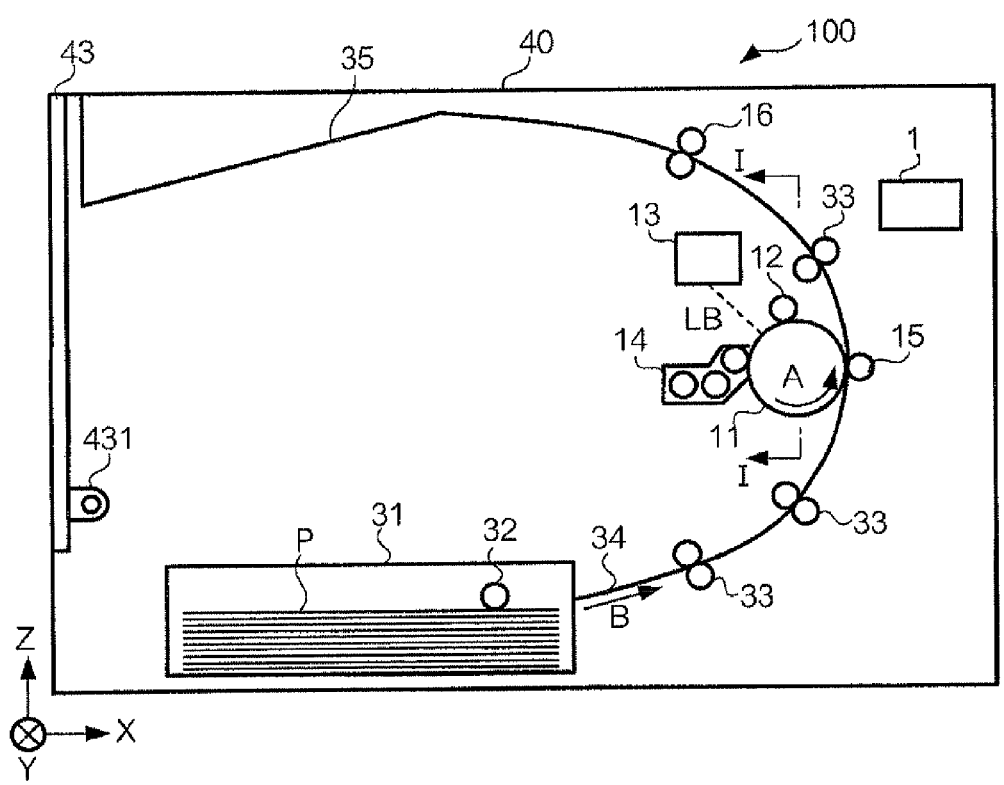
FIG. 1 is a right side view of an image forming apparatus.

FIG. 1 is a right side view of an image forming apparatus 100. FIG. 1 illustrates main constituent components associated with image formation. In FIG. 1, the right side is a back surface side of the image forming apparatus 100, the left side is a front surface side, the front side is a right surface side, and the back side is a left surface side. In the following description, the directions "front surface side", "back surface side", "right surface side", and "left surface side" are based on the image forming apparatus 100. Moreover, a direction from the front surface side of the image forming apparatus 100 to the back surface side is defined as a positive x-direction, a direction from the right surface side of the image forming apparatus 100 to the left surface side is defined as a positive Y-direction, and a direction from the lower side of the image forming apparatus 100 to the upper side is defined as a positive Z-direction. The same coordinate axes are used in FIG. 2 and the subsequent figures.

A controller 1 includes a CPU (Central Processing Unit) which is an arithmetic device and a ROM (Read Only Memory) and a RAM (Random Access Memory) which are storage devices. The CPU executes an OS stored in the ROM whereby each unit of the image forming apparatus 100 is controlled. The controller 1 includes a communication I/F (Interface) and receives data from other devices via a LAN (Local Area Network). The controller 1 converts the received data into image data of a bitmap format and outputs the image data to a writing unit 13.

A medium storage unit 31 stores sheet-like recording media P such as paper in a stacked manner, and a delivery roller 32 delivers the recording media P to a transport path 34 one by one in synchronization with the operation of a photoreceptor 11. The recording medium P is transported in the direction indicated by arrow B along the transport path 34 when a transport roller 33 provided on the transport path 34 is driven.

A charging unit 12, the writing unit 13, a developing unit 14, and a transferring unit 15 are provided around the photoreceptor 11 (an example of a rotating member and an image holding member).

The photoreceptor 11 is a rotating member that is rotated in the direction indicated by arrow A by a motor (not illustrated), and a photosensitive layer formed of a semiconductor of which the electric potential changes with light irradiated thereon is formed on a surface of the photoreceptor 11.

The charging unit 12 (an example of an image forming unit) is a corotron-type charging device, a roller-type charging device, or the like, for example, and charges the surface of the photoreceptor 11 to a predetermined electric potential.

The writing unit 13 (an example of an image forming unit) writes a latent image onto the photoreceptor 11 based on image data. Specifically, the writing unit 13 generates a laser beam LB corresponding to a gradation of each pixel represented by the image data supplied from the controller 1 and scans the surface of the photoreceptor 11 in an axial direction (main scanning direction) of the photoreceptor 11 with the laser beam LB to thereby form a latent image. When the photoreceptor 11 is rotated, the writing of latent images in respective scanning lines in the main scanning direction is repeated in a circumferential direction (sub-scanning direction) of the photoreceptor 11.

The developing unit 14 (an example of an image forming unit) develops the latent image written onto the photoreceptor 11. Specifically, a two-component developer including toner and a carrier is stored in the developing unit 14. The toner is obtained by coloring resin powder with a black colorant. The carrier is magnetic powder. A portion of the housing of the developing unit 14 is open so as to face the photoreceptor 11, and a developing roller is provided inside the housing so that the outer circumferential surface thereof faces the outer circumferential surface of the photoreceptor 11. The two-component developer adheres to the outer circumferential surface of the developing roller that is rotated. A developing bias voltage of the opposite polarity to the latent image is applied to the developing roller, and the toner is charged by the developing bias voltage, whereby the toner moves onto the latent image by electrostatic attraction. In this way, the latent image is developed with the toner, and a toner image is formed on the photoreceptor 11.

The transferring unit 15 (an example of a transfer unit) is a corotron-type charging device, a roller-type charging device, or the like, for example, and is provided at a position facing the photoreceptor 11 with the transport path 34 interposed. A transfer bias voltage of the opposite polarity to the toner image on the photoreceptor 11 is applied to the transferring unit 15, the recording medium P is charged by the transfer bias voltage, whereby the toner image is transferred to the recording medium P by electrostatic attraction.

A fixing unit 16 includes a heating member having a heat source and a pressurizing member that is pressed against the heating member. The fixing unit 16 fixes the toner image onto the recording medium P by melting and pressurizing the toner image with the recording medium P pinched between the heating member and the pressurizing member.

A discharge unit 35 is a depression that is formed on a portion of the upper surface of the housing 40 close to an exit port of the transport path 34 and has a size such that the recording media P are received therein. The recording medium P to which the toner image is fixed by the fixing unit 16 is discharged to the discharge unit 35 through the exit port of the transport path 34.

Figure 2:
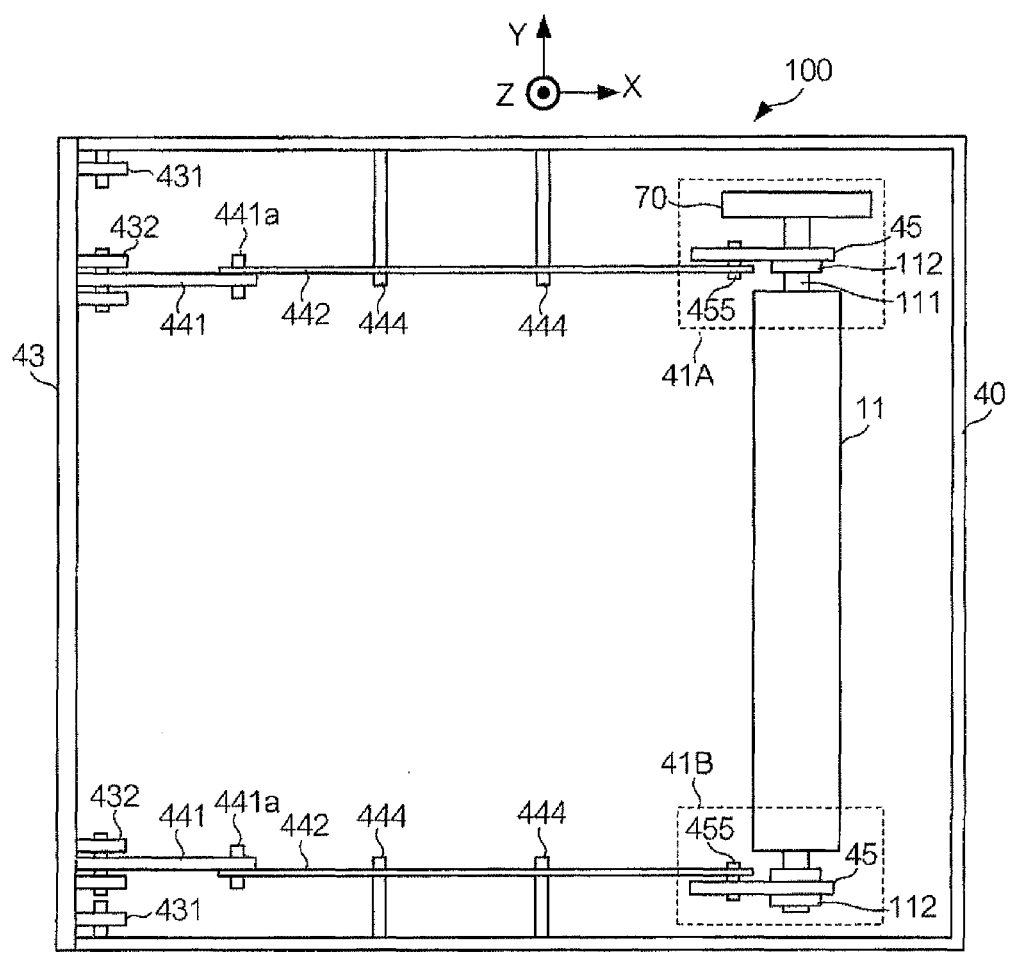
FIG. 2 is a plan view of the image forming apparatus.

FIG. 2 is a plan view (perspective view) of the image forming apparatus 100 and illustrates main constituent components associated with the supporting of the photoreceptor 11. One end of a rotating shaft 111 of the photoreceptor 11 is supported by a supporting mechanism 41A and the other end is supported by a supporting mechanism 41B. In the following description, unless there is any particular statement, the longitudinal direction of the rotating shaft 111 will be referred to as an axial direction and the rotating direction of the photoreceptor 11 will be referred to as a circumferential direction.

Figure 3:
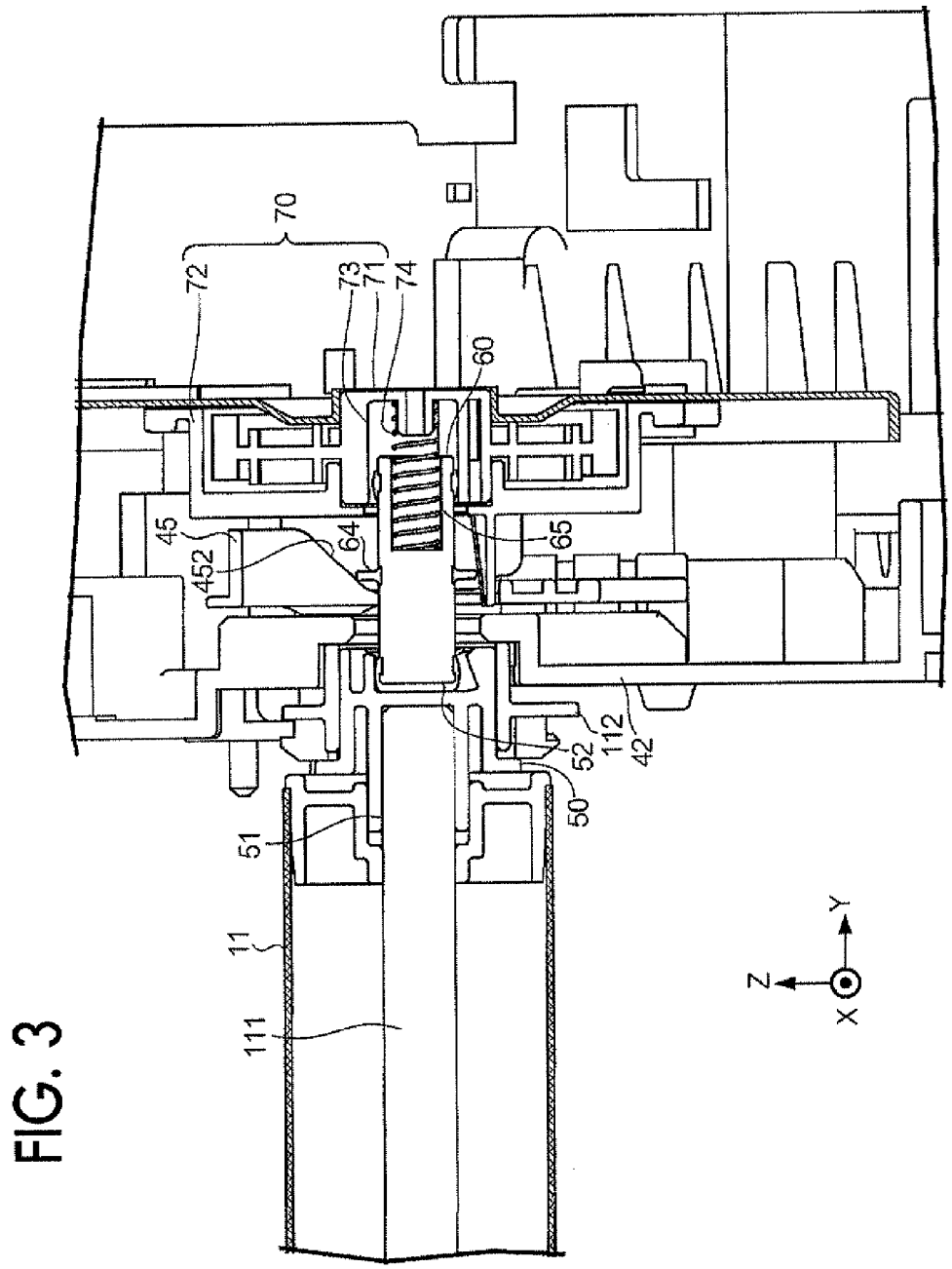
FIG. 3 is a cross-sectional view of a supporting mechanism when seen from a back surface side of the image forming apparatus.
Figure 4:
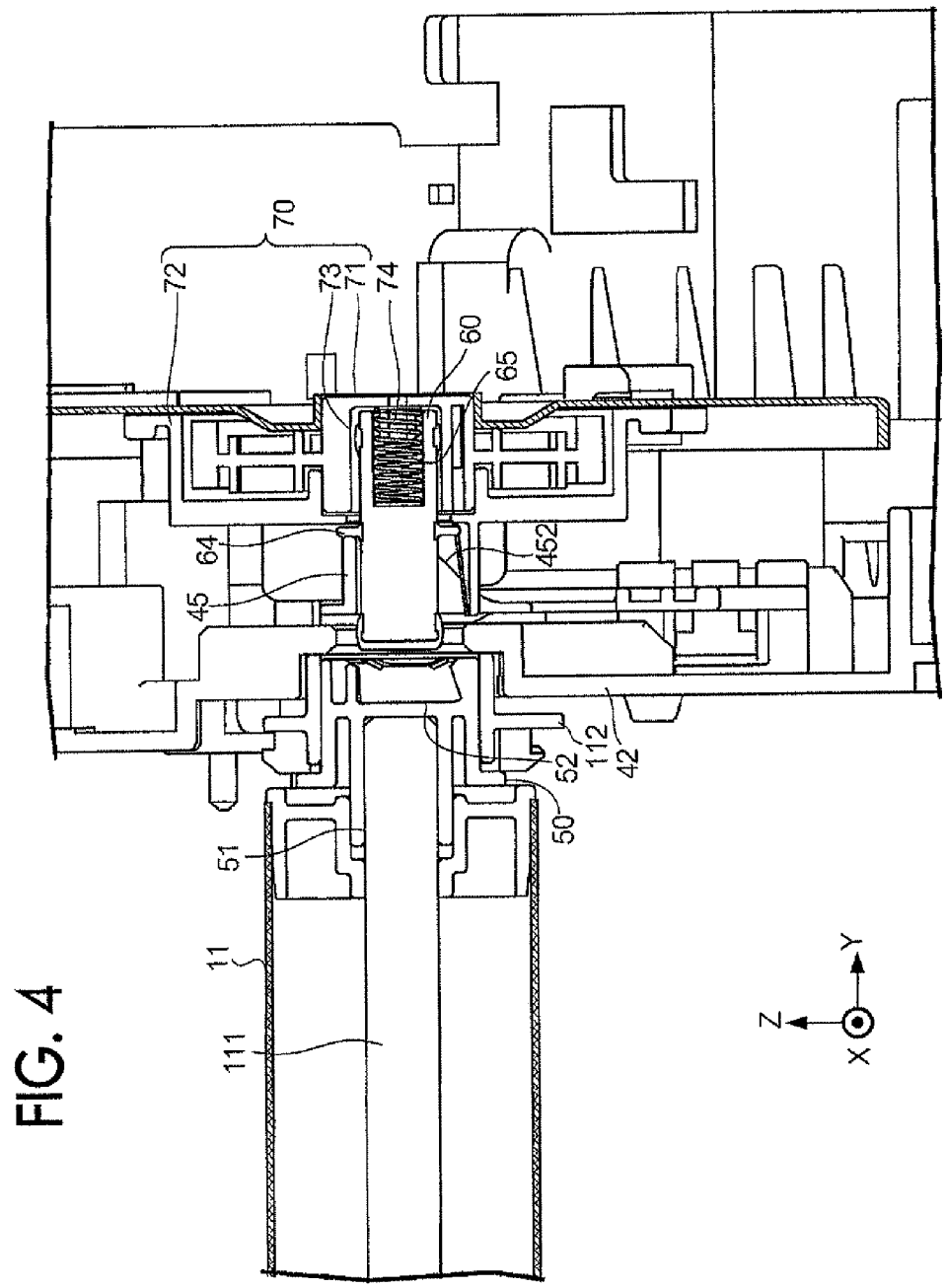
FIG. 4 is a cross-sectional view of the supporting mechanism when seen from the back surface side of the image forming apparatus.
Figure 6A:
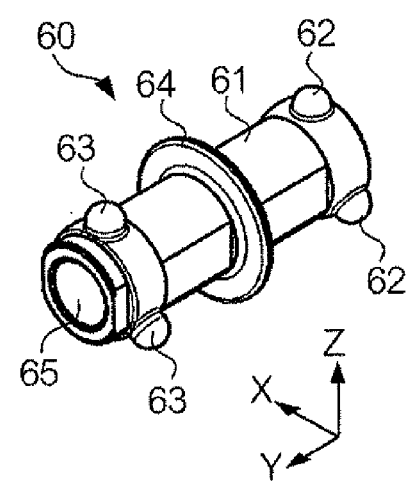
FIGS. 6A to 6E are views illustrating a driving shaft coupling.
Figure 6B:
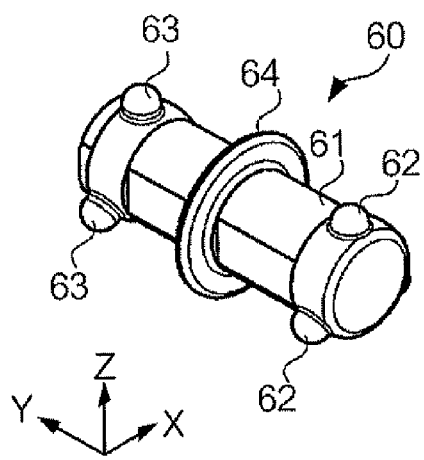
Figure 6C:
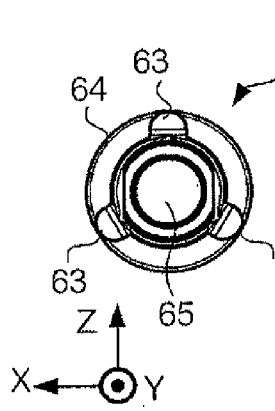
Figure 6D:
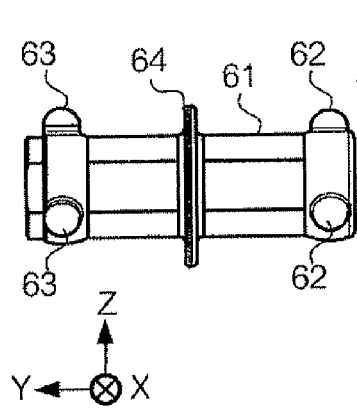
Figure 6E:
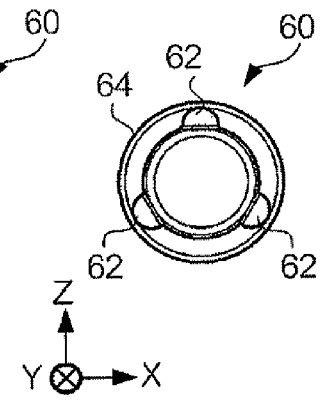

FIGS. 3 and 4 are cross-sectional views (along the direction I-I in FIG. 1) of the supporting mechanism 41A when seen from the back surface side of the image forming apparatus 100. FIGS. 3 and 4 illustrate the states before and after the contact member 45 is moved, and the movement of the contact member 45 will be described later.

FIGS. 5A to 5E are views illustrating a rotating shaft coupling 50. The rotating shaft coupling 50 is a cylindrical member, and a first concave portion 51 in which one end of the rotating shaft 111 is fitted is formed in the rotating shaft coupling 50. A cross-section in the axial direction of the first concave portion 51 has such a shape that a circle is partially deformed, and one end of the rotating shaft 111 also has a shape corresponding to the cross-section. A second concave portion 52 is formed on a side opposite to the first concave portion 51. The second concave portion 52 has a configuration in which at least one keyway 53 extending in the axial direction is formed in a cavity of which the cross-section in the axial direction is circular.

FIGS. 6A to 6E are views illustrating a driving shaft coupling 60.

The driving shaft coupling 60 transmits a driving force to the rotating shaft 111 by being connected to the rotating shaft coupling 50 that is provided at one end of the rotating shaft 111. A flange 64 is formed on the outer circumferential surface of the driving shaft coupling 60. The driving shaft coupling 60 will be described below in further detail.

The driving shaft coupling 60 includes a columnar body 61, and a first key 62 corresponding to the keyway 53 of the rotating shaft coupling 50 is formed on an outer circumferential surface close to one end of the body 61. A second key 63 is formed on an outer circumferential surface close to the other end of the body 61. A flange 64 is formed on the outer circumferential surface of the body 61. A third concave portion 65 is formed in an end surface of the body 61 close to the side where the second key 63 is formed.

As illustrated in FIG. 3, one end of the rotating shaft 111 is fitted in the first concave portion 51 of the rotating shaft coupling 50. A bearing 112 supports the rotating shaft 111 with the rotating shaft coupling 50 interposed. The bearing support portion 42 is fixed to the housing 40 and supports the bearing 112.

A motor 70 (an example of a driving source) is fixed to the housing 40. The motor 70 includes a rotator 71 and a stator 72, and a fourth concave portion 73 having a keyway (not illustrated) corresponding to the second key 63 of the driving shaft coupling 60 is formed in a central portion of the rotator 71. The length L1 in the axial direction of the driving shaft coupling 60 is shorter than the distance L2 from the bottom surface of the second concave portion 52 to the bottom surface of the fourth concave portion 73. Thus, the driving shaft coupling 60 can move in the space between the second concave portion 52 and the fourth concave portion 73 over the distance (L2−L1) in the axial direction. Moreover, the depth D1 of the second concave portion 52 is smaller than (L2−L1), and the depth of the fourth concave portion 73 is larger than (L2−L1). Thus, a state in which the second key 63 of the driving shaft coupling 60 is fitted in the keyway of the fourth concave portion 73 is maintained regardless of the position of the driving shaft coupling 60.

A spring 74 (an example of an extruding portion) extrudes the driving shaft coupling 60 in the state of being connected to the motor 70 toward the rotating shaft coupling 50 to thereby connect the driving shaft coupling 60 to the rotating shaft coupling 50. Specifically, the spring 74 that generates a repulsive force in the axial direction is interposed between the bottom surface of the third concave portion 65 and the bottom surface of the fourth concave portion 73, and the driving shaft coupling 60 is pushed out toward the rotating shaft coupling 50 by the repulsive force of the spring 74. When the driving shaft coupling 60 is pushed out, the first key 62 of the driving shaft coupling 60 is fitted in the keyway 53 of the rotating shaft coupling 50. Thus, when the driving shaft coupling 60 is pushed out, the driving force of the motor 70 is transmitted to the rotating shaft 111 via the driving shaft coupling 60 and the rotating shaft coupling 50.

Figure 7:
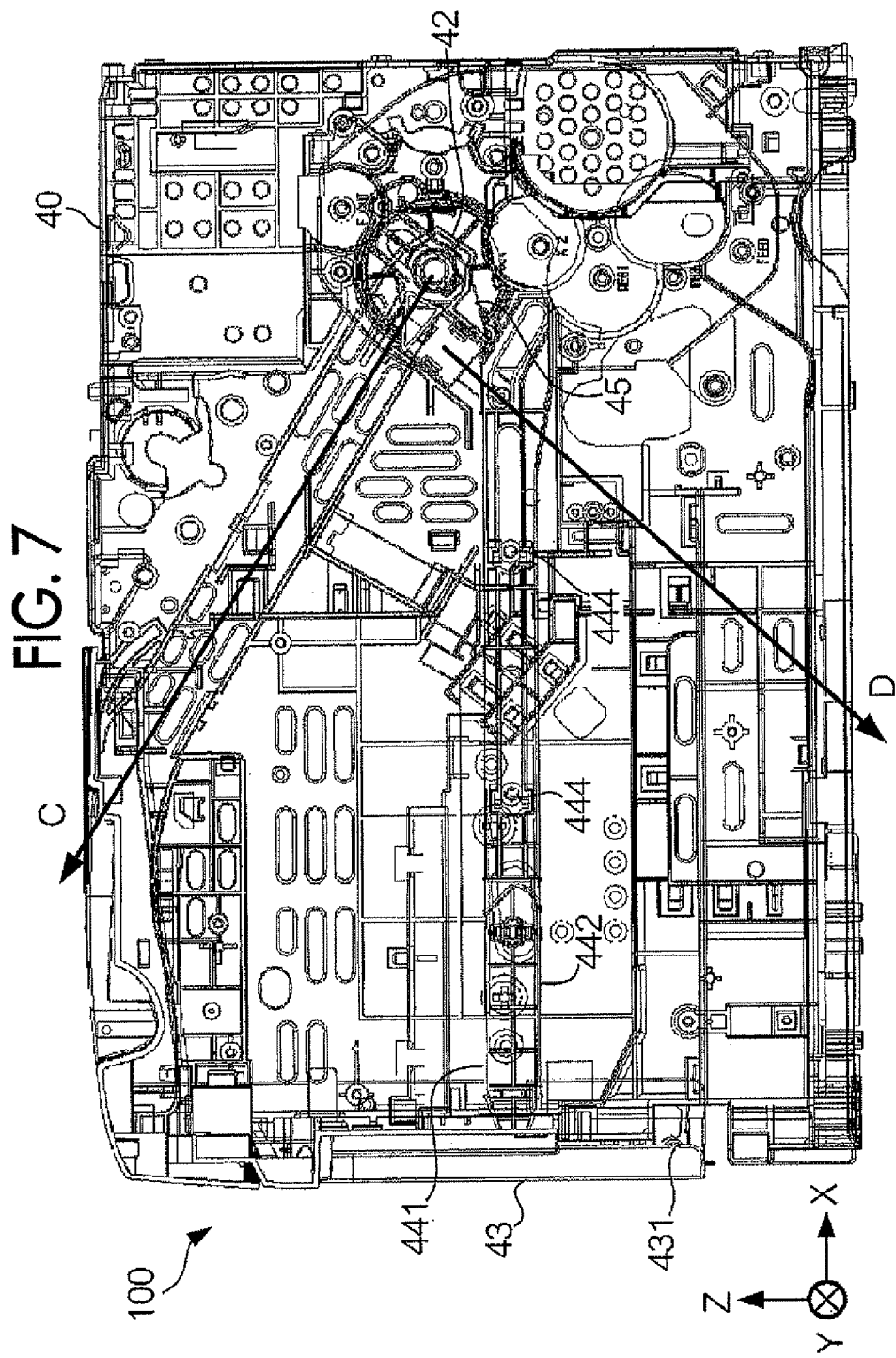
FIG. 7 is a right side view of the image forming apparatus.
Figure 8:
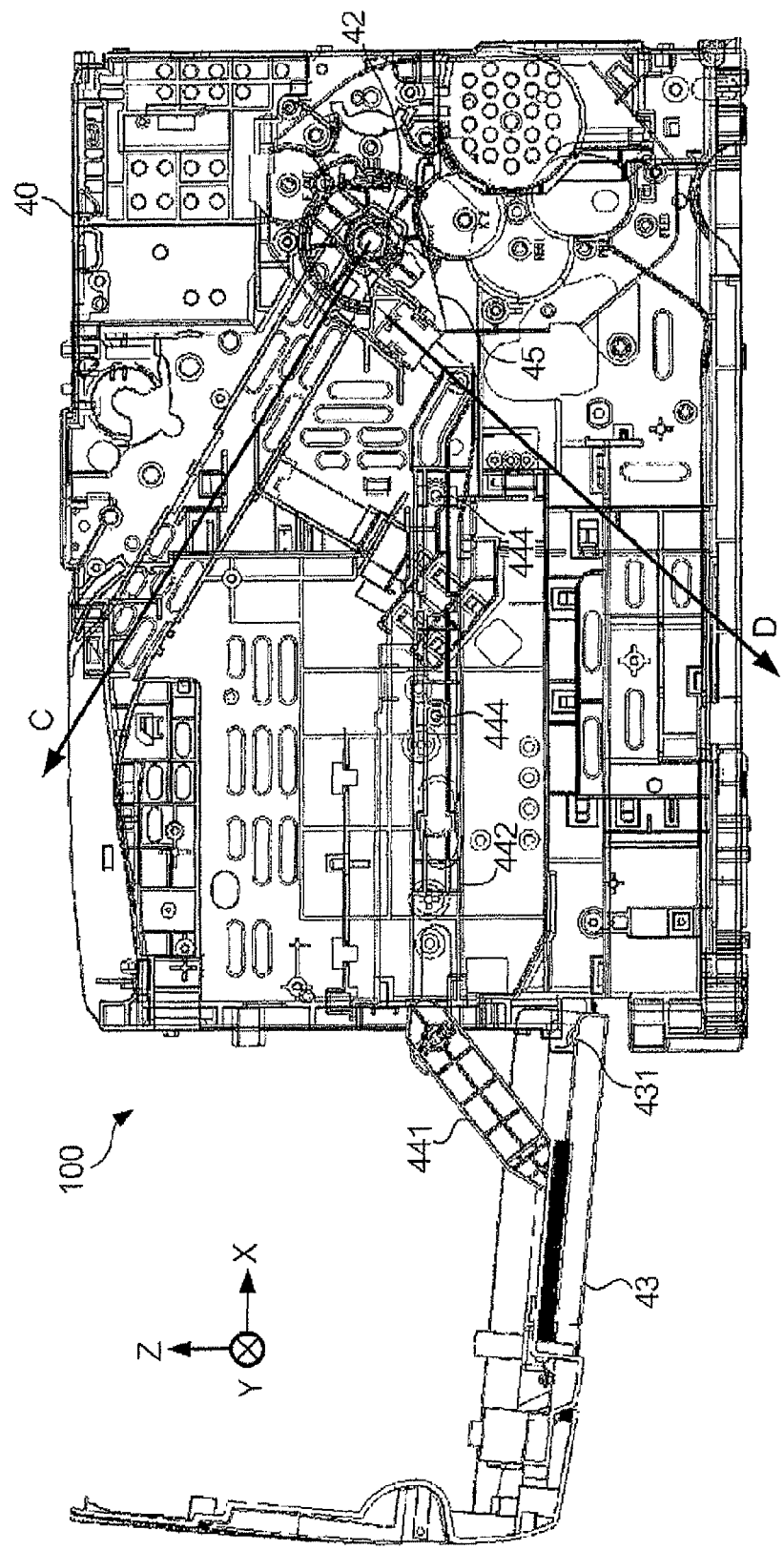
FIG. 8 is a right side view of the image forming apparatus.

FIGS. 7 and 8 are right side views (perspective views) of the image forming apparatus 100. FIG. 7 illustrates a case where the contact member 45 is positioned at a first position, and FIG. 8 illustrates a case where the contact member 45 is moved from the first position in a second direction (the direction indicated by arrow D).

Figure 9:
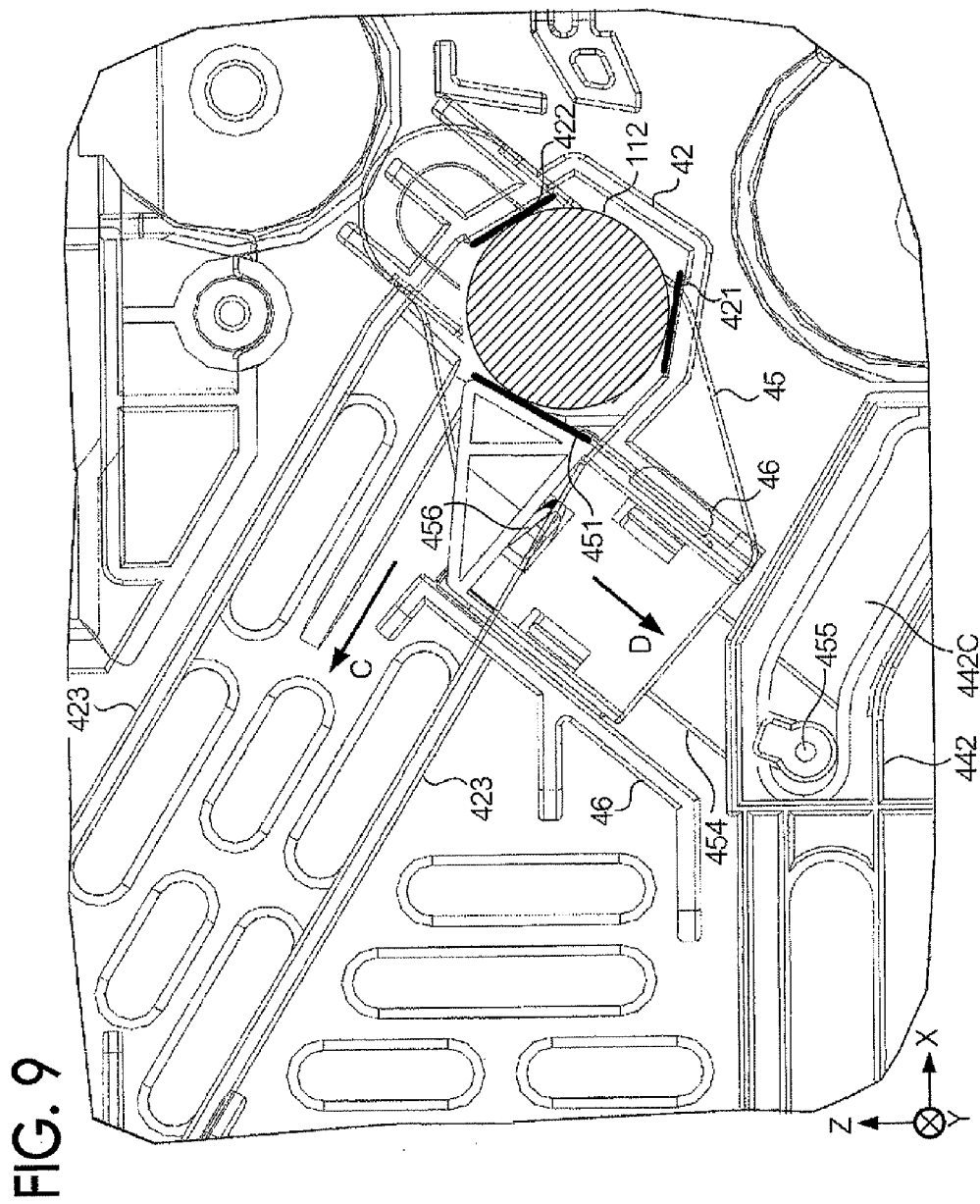
FIG. 9 is an enlarged view of the vicinity of a bearing support portion illustrated in FIG. 7.
Figure 10:
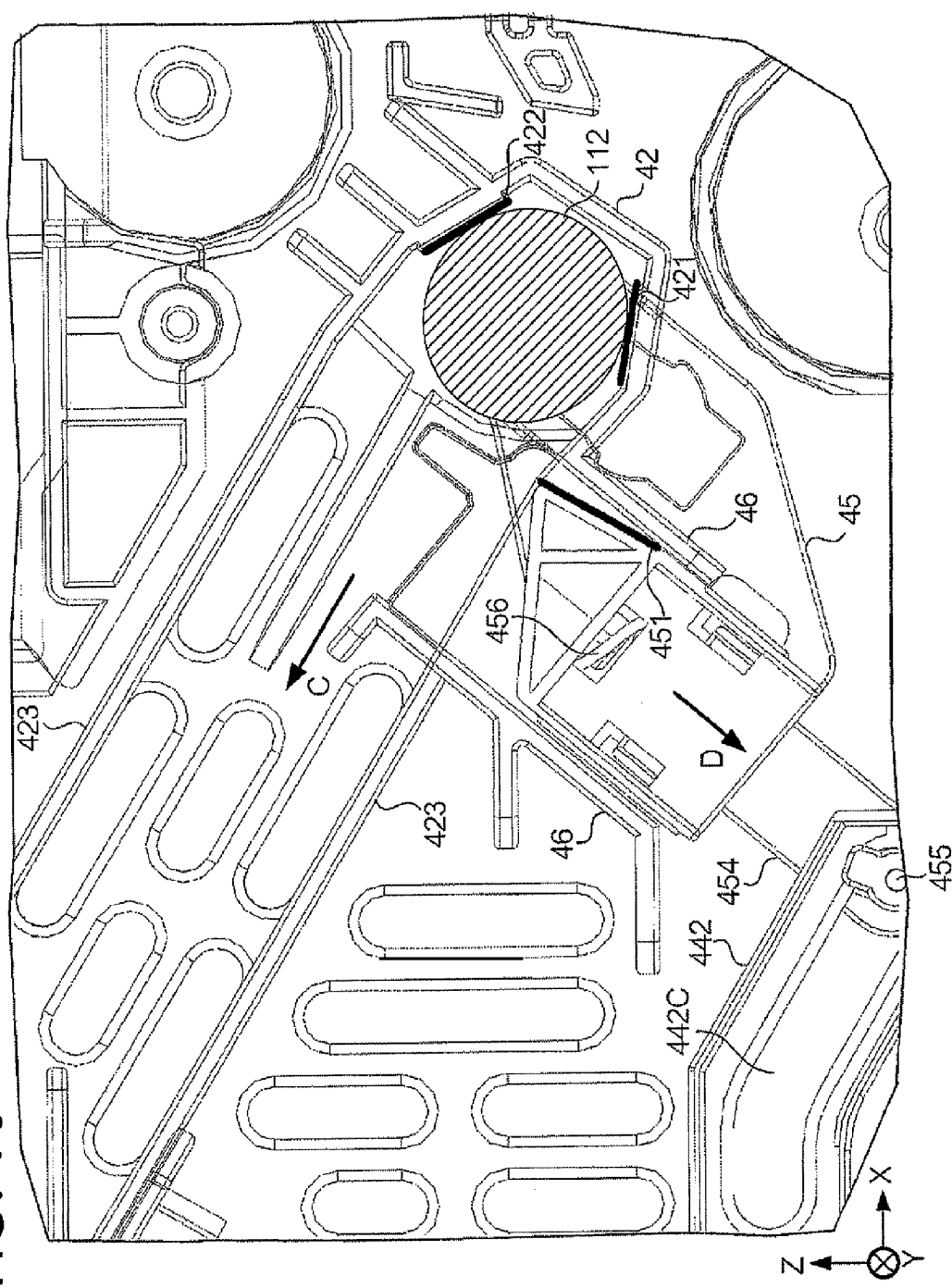
FIG. 10 is an enlarged view of the vicinity of a bearing support portion illustrated in FIG. 8.

FIGS. 9 and 10 are enlarged views of the vicinity of the bearing support portion 42 illustrated in FIGS. 7 and 8, respectively.

An opening and closing portion 43 is coupled to the housing 40 by a hinge 431 and is opened and closed as illustrated in the figures. The contact member 45 is positioned at the first position when the opening and closing portion 43 is closed, and is moved from the first position in the second direction when the opening and closing portion 43 is opened.

The bearing support portion 42 supports the bearing 112 and is open so that the bearing 112 is removed in a first direction that crosses the rotating shaft 111 supported by the bearing 112. The bearing support portion 42 will be described below in further detail.

The bearing support portion 42 includes a first support portion 421 and a second support portion 422. The first and second support portions 421 and 422 are formed in a planar form and make contact with the outer circumferential surface of the bearing 112 at two positions in the circumferential direction of the bearing 112. The first support portion 421 is positioned below the bearing 112, and the second support portion 422 is positioned close to the back surface side of the bearing 112. Since the first support portion 421 is provided to be tilted downward as it advances toward the back surface side, the bearing 112 is supported by the first and second support portions 421 and 422 without falling. The bearing support portion 42 is open to the front surface side in an obliquely upward direction (the direction indicated by arrow C and the first direction).

Two bearing guiding portions 423 are formed so as to extend from the first and second support portions 421 and 422 in the first direction, the bearing 112 passes through the space between the two bearing guiding portions 423 when the photoreceptor 11 is replaced.

FIGS. 11A to 11C are right side views of a link mechanism 44. FIGS. 12A and 12B are left side views of the link mechanism 44. The link mechanism 44 is a mechanism for linking the operations of the opening and closing portion 43 and the contact member 45.

An end portion of a first link member 441 close to the front surface side is connected to a surface of the opening and closing portion 43 close to the back surface side by a hinge 432 (see FIG. 2). A guide hole 442a having a cross-section that extends in the longitudinal direction of a second link member 442 is formed in the vicinity of an end portion of the second link member 442 close to the front surface side. A pin 441a that is formed in an end portion of the first link member 441 close to the back surface side passes through the guide hole 442a. The first link member 441 is configured to be rotated about the pin 441a relative to the second link member 442 and to move along the guide hole 442a.

Two guide holes 442b having a cross-section that extends in the longitudinal direction of the second link member 442 is formed in the longitudinal direction of a portion of the second link member 442 closer to the back surface side than the guide hole 442a. A supporting column 444 that is fixed to the housing 40 and extends in the axial direction passes through each of the guide holes 442b, and the second link member 442 is configured to move in the longitudinal direction.

A guide hole 442c having a cross-section that extends toward the back surface side in an obliquely downward direction is formed in the vicinity of an end portion of the second link member 442 close the back surface side. A peg-leg member 454 is formed in a lower portion of the contact member 45, and a pin 455 formed in the peg-leg member 454 passes through the guide hole 442c. Two guide portions 46 are formed in the housing 40 so as to extend toward the front surface side in an obliquely downward direction (the direction indicated by arrow D and the second direction), and the contact member 45 is configured to move in the second direction and in the direction opposite to the second direction in a state of being pinched between the two guide portions 46.

FIGS. 13A to 13E are views illustrating the contact member 45. FIGS. 14A and 14B are views illustrating a positional relationship between the contact member 45 and the driving shaft coupling 60.

The contact member 45 includes a bearing contact portion 451 that makes contact with the bearing 112. The bearing contact portion 451 makes contact with the bearing 112 so as to restrict the movement of the bearing 112 in the first direction when the contact member 45 is positioned at the first position. The bearing contact portion 451 is separated from the bearing 112 so as not to restrict the movement of the bearing 112 in the first direction when the contact member 45 is moved from the first position in the second direction that crosses the rotating shaft 111.

The bearing contact portion 451 has a contacting portion that is formed in a planar form, and the contacting portion makes contact with the outer circumferential surface of the bearing 112 from the front surface side of the bearing 112. Moreover, the peg-leg member 454 and the contact member 45 are connected by a spring 456, and the contact member 45 is pushed out in the direction opposite to the second direction by the repulsive force of the spring 456. Thus, the bearing contact portion 451 is pressed against the outer circumferential surface of the bearing 112 at the first position. Although the bearing 112 is not illustrated in FIGS. 14A and 14B, the rotating shaft coupling 50 is connected to the side of the driving shaft coupling 60 where the first key 62 is formed, and the rotating shaft coupling 50 is supported by the bearing 112. That is, the bearing 112 is provided in the back side of the bearing contact portion 451 in FIGS. 14A and 14B.

The contact member 45 includes a driving shaft coupling contacting portion 452 that makes contact with the flange 64 from the side of the rotating shaft coupling 50. The driving shaft coupling contacting portion 452 has a contacting portion that extends toward the left surface side of the image forming apparatus 100 in an obliquely upward direction, and the contacting portion makes contact with the flange 64 from the right surface side. The contacting portion is formed to be inclined in relation to the second direction so that the driving shaft coupling 60 is pulled back in a direction away from the rotating shaft coupling 50 as the contact member 45 moves in the second direction. The driving shaft coupling 60 is pushed out toward the rotating shaft coupling 50 by the spring 74 so as to be connected to the rotating shaft coupling 50 when the contact member 45 is positioned at the first position. The driving shaft coupling 60 is pulled back by the driving shaft coupling contacting portion 452 so as to move away from the rotating shaft coupling 50 when the contact member 45 is moved from the first position in the second direction.

The supporting mechanism 41B has the same configuration as the supporting mechanism 41A except that the contact member 45 does not include the driving shaft coupling contacting portion 452.

First Exemplary Embodiment

Next, the operation of the first exemplary embodiment will be described.

When the opening and closing portion 43 is closed, a state in which the first and second link members 441 and 442 are pushed toward the back surface side is created, and the contact member 45 is positioned at the first position (see FIGS. 7, 9, 11B, and 11C). At the first position, the bearing contact portion 451 of the contact member 45 makes contact with the bearing 112, whereby the movement of the bearing 112 in the first direction is restricted (see FIG. 9). The positioning of the bearing 112 is realized when three points in the circumferential direction of the bearing 112 are supported by the bearing contact portion 451 and the first and second support portions 421 and 422 of the bearing support portion 42. Moreover, since the driving shaft coupling contacting portion 452 of the contact member 45 does not pull back the flange 64, a state in which the driving shaft coupling 60 is pushed out toward the spring 74 is created. As a result, a state in which the driving shaft coupling 60 is connected to the rotating shaft coupling 50 is created (see FIGS. 3 and 14A).

When the opening and closing portion 43 is opened (see FIGS. 8 and 11A), the first link member 441 is moved toward the front surface side while rotating counterclockwise, and with this movement, the second link member 442 is moved toward the front surface side. Since the guide hole 442c extends toward the back surface side in an obliquely downward direction, the contact member 45 is moved in the second direction in accordance with the movement of the second link member 442. As a result, the bearing contact portion 451 is separated from the bearing 112, and the movement of the bearing 112 in the first direction is not restricted (see FIG. 10). That is, the positioning of the bearing 112 is released. Moreover, since the contact member 45 is moved in the second direction with the driving shaft coupling contacting portion 452 making contact with the flange 64, the flange 64 is pulled back by the driving shaft coupling contacting portion 452 (see FIG. 14B). As a result, the driving shaft coupling 60 is pulled back in a direction of being separated from the rotating shaft coupling 50, and the driving shaft coupling 60 is separated from the rotating shaft coupling 50 (see FIG. 4).

According to the first exemplary embodiment, when the opening and closing portion 43 is opened, the release of the positioning of the bearing 112 and the separation of the driving shaft coupling 60 from the rotating shaft coupling 50 are realized concurrently. Moreover, when the opening and closing portion 43 is closed, the positioning of the bearing 112 and the connection of the driving shaft coupling 60 to the rotating shaft coupling 50 are realized concurrently.

Moreover, since the separation of the driving shaft coupling 60 from the rotating shaft coupling 50 is realized by moving the driving shaft coupling 60 in a direction of being separated from the rotating shaft coupling 50, a space of moving the photoreceptor 11 in the axial direction is not necessary.

Moreover, since the contact member 45 performs the two functions of positioning the bearing 112 and separating the driving shaft coupling 60, the number of components decreases as compared to a configuration in which these functions are realized by separate components.

First Modification Example

The first exemplary embodiment may be modified like a modification example described later. Moreover, the first exemplary embodiment and the first modification example may be combined. Moreover, plural modification examples may be combined.

In the first exemplary embodiment, although an example in which the bearing 112 supports the rotating shaft 111 with the rotating shaft coupling 50 interposed has been described, the bearing 112 may support the rotating shaft 111 directly without the rotating shaft coupling 50 interposed.

In the first exemplary embodiment, although an example in which the driving shaft coupling 60 is connected to the rotator 71 of the motor 70 has been described, the driving force of the motor 70 may be transmitted to the driving shaft coupling 60 via a gear train.

In the first exemplary embodiment, although the photoreceptor 11 has been described as an example of a rotating member, the invention may be applied as a supporting mechanism for a bearing of the rotating shaft of a developing roller, a roller-type charging device, a roller-type transfer device, or the like, for example.

In the first exemplary embodiment, although an example in which the photoreceptor 11 is solely replaced has been described, the invention may be applied to an image forming apparatus that uses a cartridge in which at least one constituent component that is provided around the photoreceptor 11, such as the charging unit 12, the developing unit 14, or a removal unit that removes toner remaining in the photoreceptor 11 is integrated with the photoreceptor 11.

In the first exemplary embodiment, although an example in which the positioning of the bearing 112 is realized by supporting three points in the circumferential direction of the bearing 112 has been described, a bearing support portion having a curved surface corresponding to the outer circumferential surface of the bearing 112 may be formed, for example.

In the first exemplary embodiment, although an example in which the positioning or release of the bearing 112 and the connection or separation of the driving shaft coupling 60 are realized concurrently with the opening and closing of the opening and closing portion 43 has been described, the user may operate the contact member 45 rather than providing the link mechanism 44, for example. In this case, the positioning or release of the bearing 112 and the connection or separation of the driving shaft coupling 60 are also realized concurrently.

In the first exemplary embodiment, although an example in which the driving shaft coupling contacting portion 452 is provided on the front surface side and the back surface side of the driving shaft coupling 60 has been described, the driving shaft coupling contacting portion 452 may be provided any one of the front surface side and the back surface side.

In the first exemplary embodiment, although an example in which the spring 74 extrudes the driving shaft coupling 60 toward the rotating shaft coupling 50 has been described, the spring 74 may pull back the driving shaft coupling 60 in a direction of being separated from the rotating shaft coupling 50. In this case, the driving shaft coupling contacting portion 452 is configured to make contact with the flange 64 from the opposite side of the rotating shaft coupling 50. That is, in this configuration, when the contact member 45 is positioned at the first position, the driving shaft coupling 60 is pushed out toward the rotating shaft coupling 50 by the driving shaft coupling contacting portion 452. When the contact member 45 is moved from the first position in the second direction, the driving shaft coupling 60 is pulled back so as to be separated from the rotating shaft coupling 50 by the spring 74.

Second Exemplary Embodiment

Figure 15:
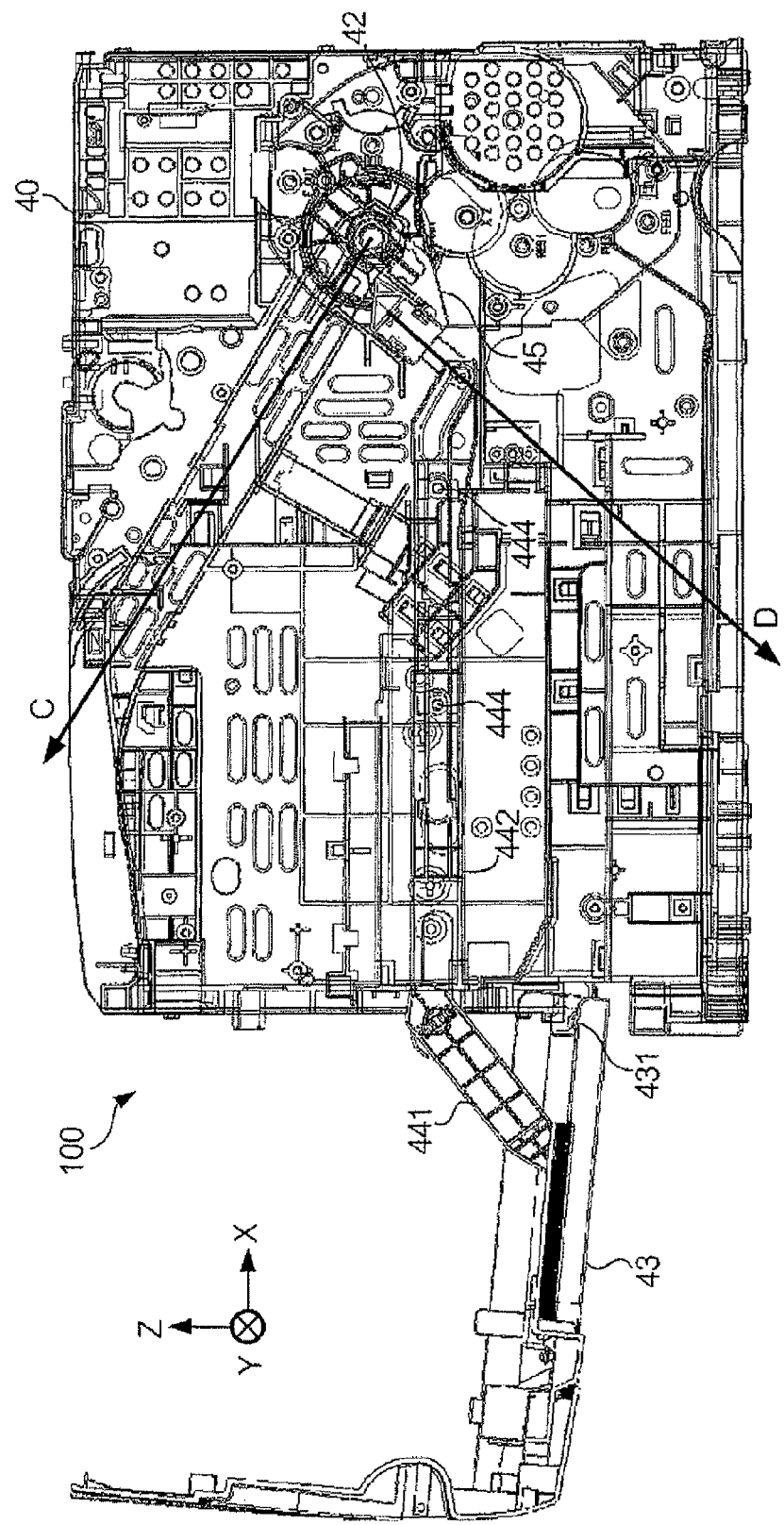
FIG. 15 is a right side view of the image forming apparatus.

FIGS. 7 and 15 are right side views (perspective views) of the image forming apparatus 100. FIG. 7 illustrates a state in which the contact member 45 is positioned at the first position, and FIG. 15 illustrates a case where the contact member 45 is moved from the first position in the second direction (the direction indicated by arrow D) and is positioned at the second position.

FIGS. 16 and 17 are left side views (perspective views) of the image forming apparatus 100 and are enlarged views of the supporting mechanism 41A. FIG. 16 illustrates a case where the contact member 45 is positioned at the first position, and FIG. 17 illustrates a case where the contact member 45 is moved from the first position in the second direction (the direction indicated by arrow D) and is positioned at the second position.

As illustrated in FIGS. 7 and 15, the opening and closing portion 43 is a door in which a side surface on the front surface side of the housing 40 and a portion of a top board continuous to the side surface are integrated. The opening and closing portion 43 is coupled to the housing 40 by the hinge 431 and is opened and closed about the hinge 431. The contact member 45 is positioned at the first position when the opening and closing portion 43 is closed (see FIGS. 7 and 16), and the contact member 45 is moved from the first position in the second direction and is positioned at the second position when the opening and closing portion 43 is opened (see FIGS. 15 and 17).

The bearing support portion 42 supports the bearing 112 and is open so that the bearing 112 is removed in the first direction (the direction indicated by arrow C) that crosses the rotating shaft 111 supported by the bearing 112. The bearing support portion 42 will be described below in further detail.

An end portion of the rotating shaft 111 of the photoreceptor 11 is supported by the bearing 112, and the bearing 112 is supported by the bearing support portion 42. The bearing support portion 42 includes a first support portion 421 and a second support portion 422. The first and second support portions 421 and 422 are formed in a planar form and make contact with the outer circumferential surface of the bearing 112 at two positions in the circumferential direction of the bearing 112. The first support portion 421 is positioned below the bearing 112, and the second support portion 422 is positioned close to the back surface side of the bearing 112. Since the first support portion 421 is provided to be tilted downward as it advances toward the back surface side, the bearing 112 is supported by the first and second support portions 421 and 422 without falling. The bearing support portion 42 is open to the front surface side in an obliquely upward direction (the direction indicated by arrow C and the first direction). Two bearing guiding portions 423 are formed so as to extend on the housing 40 from the first and second support portions 421 and 422 in the first direction, the bearing 112 passes through the space between the two bearing guiding portions 423 when the photoreceptor 11 is replaced.

Figure 18A:
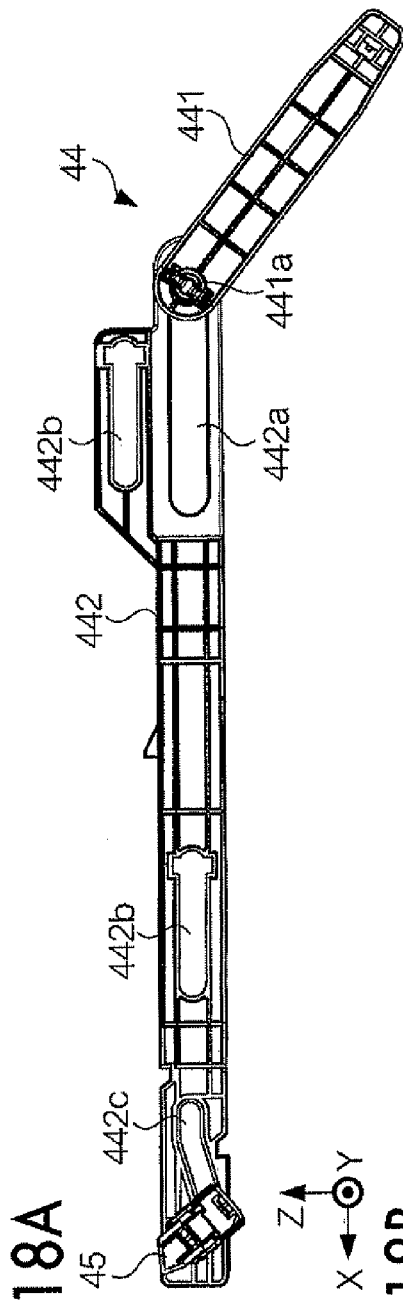
FIGS. 18A to 18C are left side views of a link mechanism.
Figure 18B:
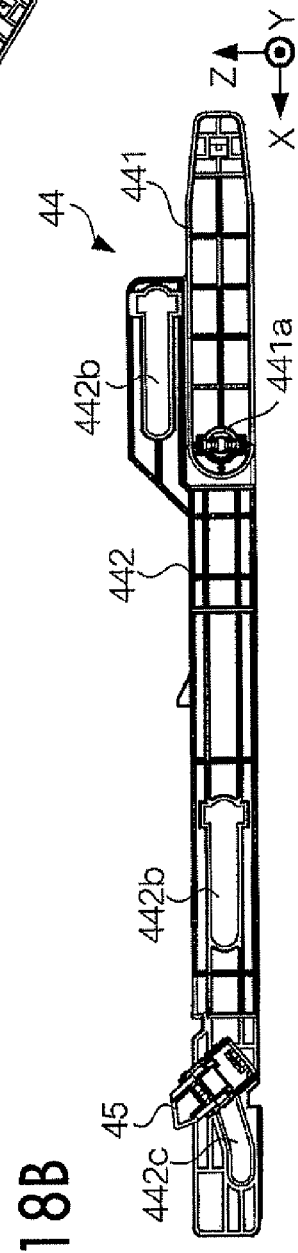
Figure 18C:
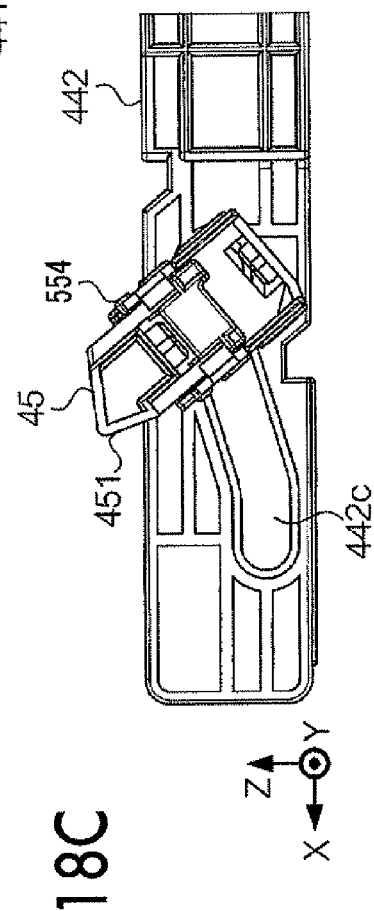
Figure 21C:
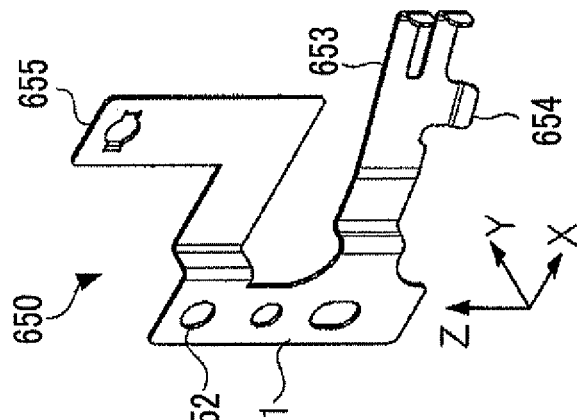
Figure 21B:
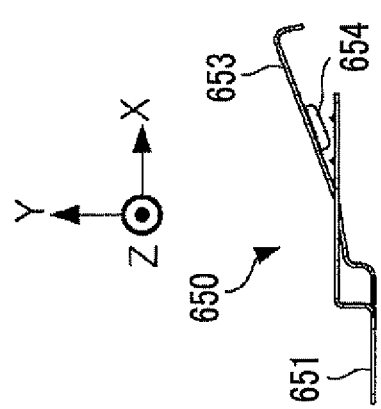
Figure 21A:
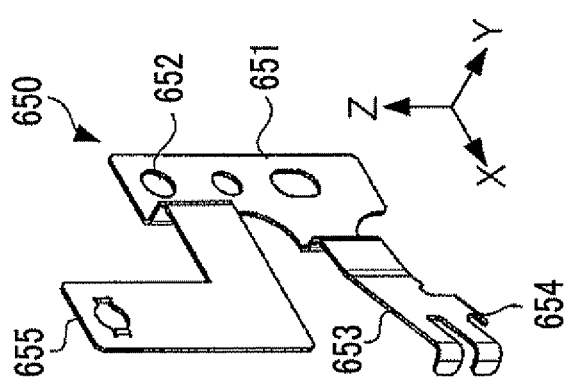

FIGS. 18A to 18C are left side views of the link mechanism 44. FIGS. 19A to 19C are right side views of the link mechanism 44. The link mechanism 44 is a mechanism for linking the operations of the opening and closing portion 43 and the contact member 45.

An end portion of the first link member 441 close to the front surface side is connected to a surface of the opening and closing portion 43 close to the back surface side by the hinge 432 (see FIG. 2). The guide hole 442a having a cross-section that extends in the longitudinal direction of the second link member 442 is formed in the vicinity of an end portion of the second link member 442 close to the front surface side. The pin 441a that is formed in an end portion of the first link member 441 close to the back surface side passes through the guide hole 442a. The first link member 441 is configured to be rotated about the pin 441a relative to the second link member 442 and to move along the guide hole 442a.

The two guide holes 442b having a cross-section that extends in the longitudinal direction of the second link member 442 is formed in the longitudinal direction of the second link member 442. A supporting column 444 that is fixed to the housing 40 and extends in the axial direction passes through each of the guide holes 442b (see FIG. 2), and the second link member 442 is configured to move in the longitudinal direction.

The contact member 45 is supported by a supporting member 554. The supporting member 554 is a box-shaped member, for example, and has an opening that is open toward the back surface side in an obliquely upward direction. The contact member 45 is received inside the supporting member 554, the outer surface of the contact member 45 is in contact with the inner surface of the supporting member 554, and the contact member 45 is configured to move in the second direction (the direction indicated by arrow D) and the opposite direction in relation to the supporting member 554. The spring 456 is interposed between the bottom surface on the outer side of the contact member 45 and the bottom surface on the inner side of the supporting member 554.

The pin 455 is formed in the supporting member 554. The guide hole 442c having a cross-section that extends toward the back surface side in an obliquely downward direction is formed in the vicinity of an end portion of the second link member 442 close the back surface side, and the pin 455 passes through the guide hole 442c (see FIGS. 19A to 19C). The two guide portions 46 that extends toward the front surface side in an obliquely downward direction (the direction indicated by arrow D and the second direction) are formed in the housing 40, and the contact member 45 is configured to move in the second direction and in the direction opposite to the second direction in a state of being pinched between the two guide portions 46.

FIGS. 20A to 20G are views illustrating the contact member 45.

The contact member 45 includes the bearing contact portion 451 that makes contact with the outer circumferential surface of the bearing 112 and an electrode contacting portion 552 that makes contact with a ground electrode 650. When the bearing 112 is inserted in the bearing support portion 42, and the contact member 45 is positioned at the first position, the bearing contact portion 451 makes contact with the outer circumferential surface of the bearing 112 so as to restrict the movement of the bearing 112 in the first direction. Moreover, when the contact member 45 is moved from the first position in the second direction that crosses the rotating shaft 111, the bearing contact portion 451 is separated from the bearing 112 so as not to restrict the movement of the bearing 112 in the first direction.

The bearing contact portion 451 is formed in a planar form and makes contact with the outer circumferential surface of the bearing 112 from the front surface side of the bearing 112. Moreover, the spring 456 is interposed between the bottom surface on the outer side of the contact member 45 and the bottom surface on the inner side of the supporting member 554, and the contact member 45 is pushed out in the direction opposite to the second direction in relation to the supporting member 554 by the repulsive force of the spring 456. Thus, at the first position, the bearing contact portion 451 is pressed against the outer circumferential surface of the bearing 112.

When the bearing support portion 42 is separated from the bearing 112, the electrode contacting portion 552 makes contact with and guides the ground electrode 650 in accordance with the movement of the contact member 45 in the direction opposite to the second direction so that the ground electrode 650 and the contact member 45 do not interrupt each other. The electrode contacting portion 552 will be described below in further detail.

At least one of the electrode contacting portion 552 and the contacting portion 654 of the ground electrode 650 that makes contact with the electrode contacting portion 552 is formed to be inclined in relation to the second direction so that when the bearing 112 is separated from the bearing support portion 42, the ground electrode 650 is pushed back in a direction away from the bearing support portion 42 in accordance with the movement of the contact member 45 in the direction opposite to the second direction. The electrode contacting portion 552 is formed in a planar form and makes contact with the ground electrode 650 from the side of the rotating shaft 111. The electrode contacting portion 552 is formed to be inclined in the second direction.

FIGS. 21A to 21E are views illustrating the ground electrode 650.

The ground electrode 650 includes a fixing portion 651 having a screw hole 652 formed therein, and the fixing portion 651 is fixed to the housing 40 by screws. An electric wire connection portion 655 for connecting grounding electric wires is formed in an upper portion of the fixing portion 651. A rotating shaft contacting portion 653 that extends from the fixing portion 651 toward the back surface is formed in a lower portion of the fixing portion 651. Since the fixing portion 651 is fixed to the housing 40, the rotating shaft contacting portion 653 forms a cantilever in which the fixing portion 651 is used as a fixed end thereof. The rotating shaft contacting portion 653 makes contact with the end surface of the rotating shaft 111 when the bearing 112 is inserted in the bearing support portion 42. The contacting portion 654 that makes contact with the electrode contacting portion 552 of the contact member 45 is formed in a lower portion of the rotating shaft contacting portion 653. The contacting portion 654 is formed to be inclined in the second direction.

The supporting mechanism 41B has the same configuration as the supporting mechanism 41A except that the contact member 45 does not include the electrode contacting portion 552. Moreover, on the side of the supporting mechanism 41B, the rotating shaft 111 is connected to the motor 70 via a shaft coupling, a gear train, or the like (not illustrated).

Next, the operation of the second exemplary embodiment will be described.

First, it is assumed that the bearing 112 is inserted in the bearing support portion 42.

When the opening and closing portion 43 is closed, a state in which the first and second link members 441 and 442 are pushed toward the back surface side is created, and the contact member 45 is positioned at the first position (see FIGS. 7, 18B, 18C, 19B, and 19C). At the first position, the bearing contact portion 451 of the contact member 45 makes contact with the bearing 112, whereby the movement of the bearing 112 in the first direction is restricted (see FIG. 16). The positioning of the bearing 112 is realized when three points in the circumferential direction of the bearing 112 are supported by the bearing contact portion 451 and the first and second support portions 421 and 422 of the bearing support portion 42.

When the opening and closing portion 43 is opened (see FIGS. 15, 18A, and 19A), the first link member 441 is moved toward the front surface side while rotating, and with this movement, the second link member 442 is moved toward the front surface side. Since the guide hole 442c extends toward the back surface side in an obliquely downward direction, the contact member 45 is moved in the second direction in accordance with the movement of the second link member 442. As a result, the bearing contact portion 451 is separated from the bearing 112, and the movement of the bearing 112 in the first direction is not restricted (see FIG. 17). In this way, the positioning of the bearing 112 is released.

Figure 22:
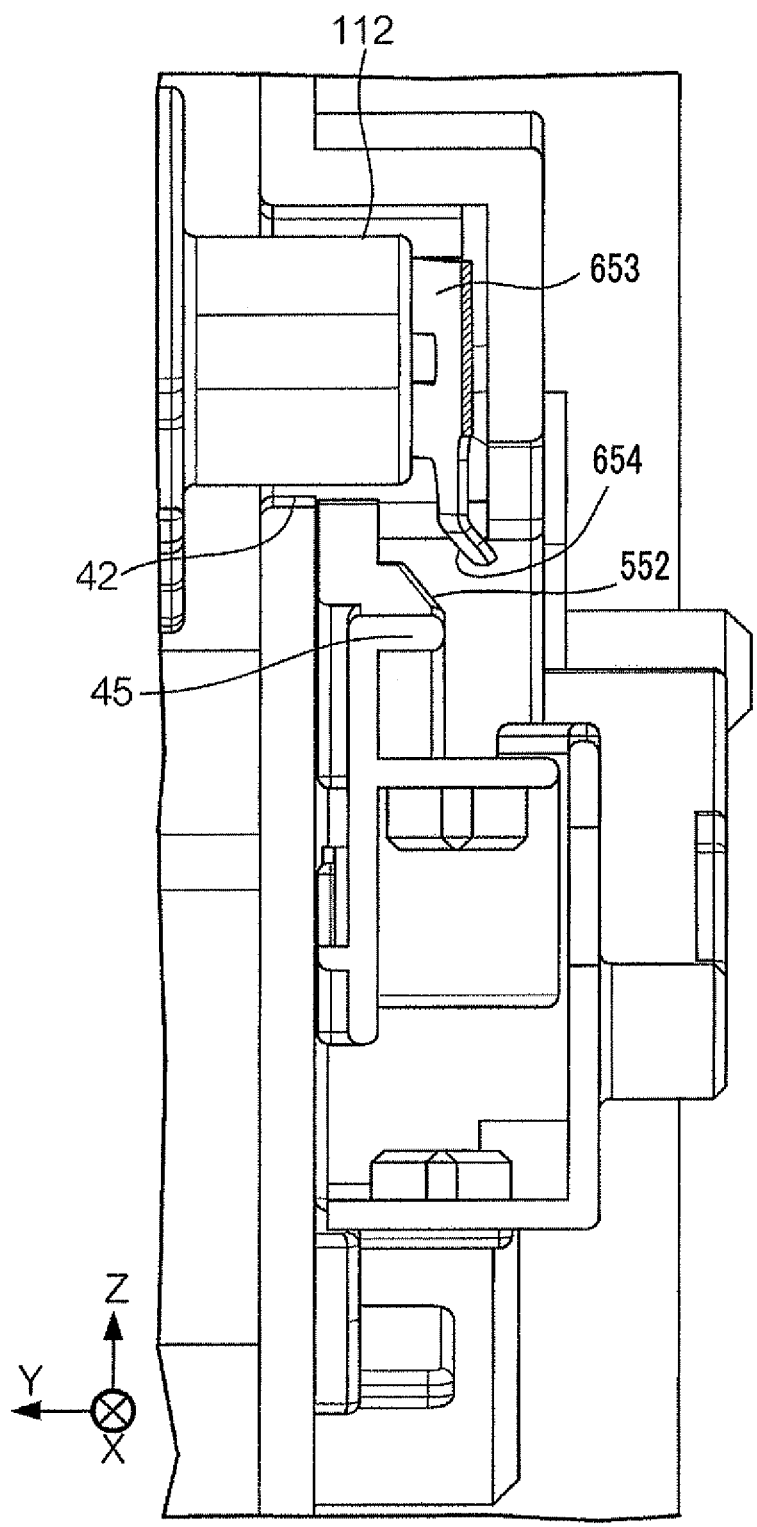
FIG. 22 is a front view of a supporting mechanism.

FIG. 22 is a front view of the supporting mechanism 41A in the above-described state. The rotating shaft contacting portion 653 of the ground electrode 650 makes contact with the end surface of the rotating shaft 111 (in the figure, the rotating shaft 111 is concealed by the bearing 112) in a state of being pushed against the end surface. In other words, the rotating shaft contacting portion 653 is pressed against the end surface of the rotating shaft 111 by a restoring force that is generated by deformation of the rotating shaft contacting portion 653 itself.

Figure 23:
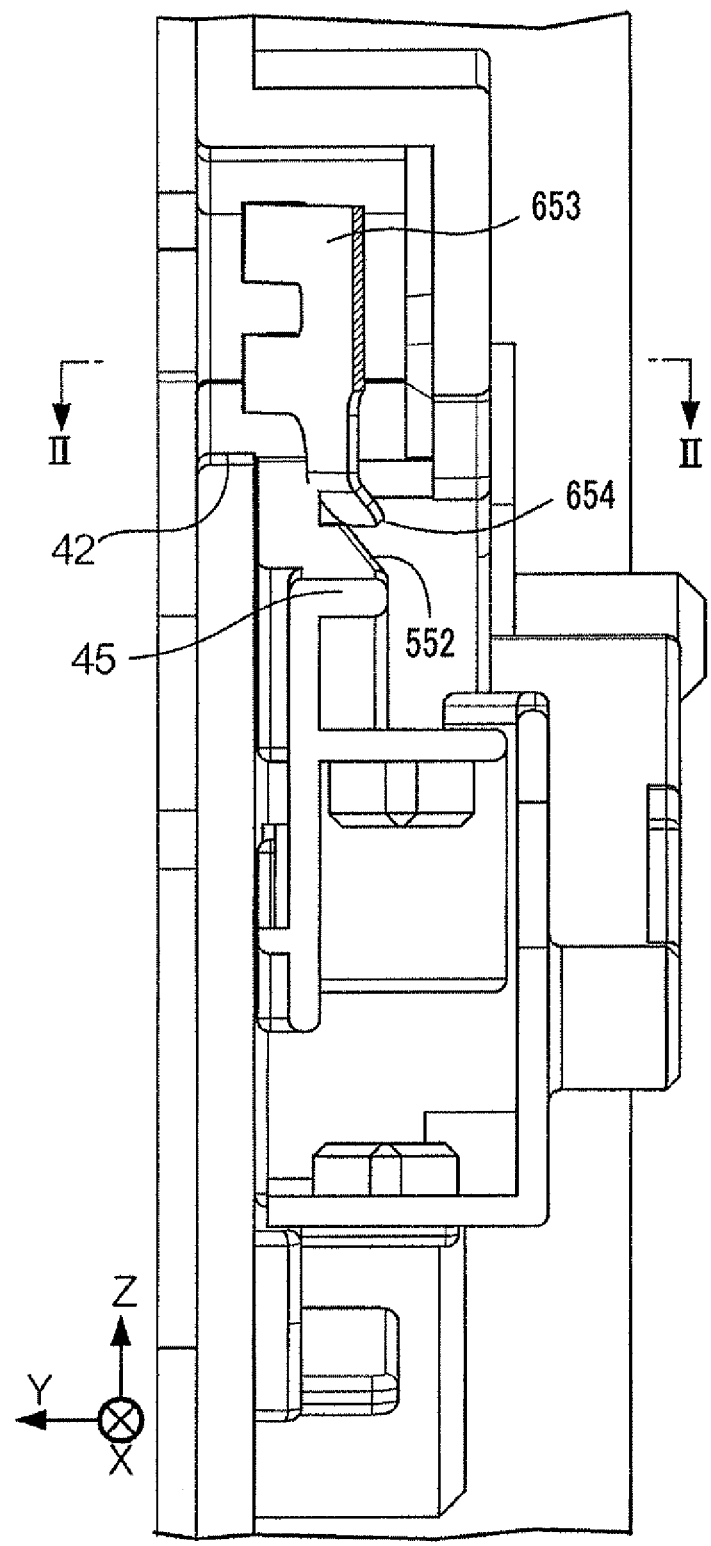
FIG. 23 is a view illustrating a state in which a bearing is removed from the bearing support portion.
Figure 25:
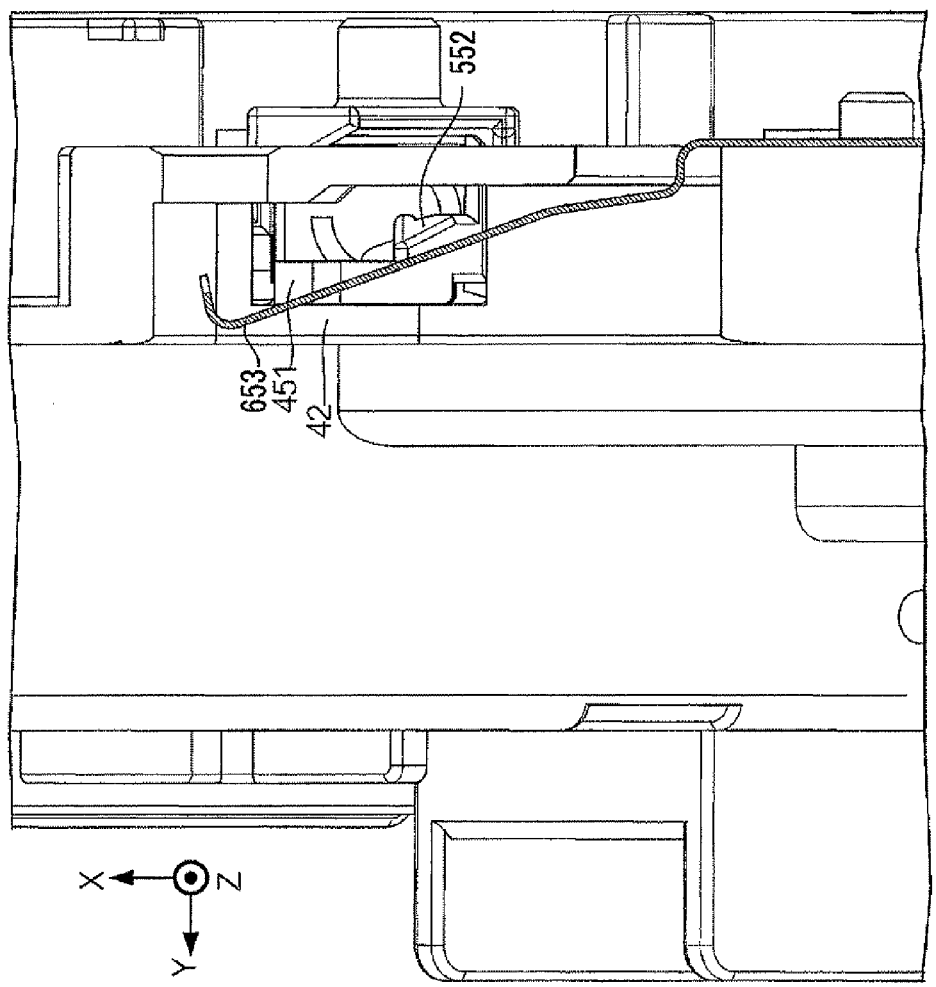
FIG. 25 is a cross-sectional view along the direction II-II in FIG. 23.

FIG. 23 is a view illustrating a state in which the bearing 112 is removed from the bearing support portion 42. FIG. 25 is a cross-sectional view along the direction II-II in FIG. 23. Since the rotating shaft 111 which has been pushing the rotating shaft contacting portion 653 is removed, the rotating shaft contacting portion 653 projects toward the bearing support portion 42.

As understood from FIG. 23, the electrode contacting portion 552 of the contact member 45 and the contacting portion 654 of the ground electrode 650 are formed to be inclined in relation to the second direction (the direction indicated by arrow D) and are positioned so as to face each other. Thus, when the contact member 45 is moved in the direction opposite to the second direction, the electrode contacting portion 552 and the contacting portion 654 make contact with each other, and the ground electrode 650 is pushed back in a direction away from the bearing support portion 42 with the electrode contacting portion 552 and the contacting portion 654 making frictional contact with each other.

Figure 24:
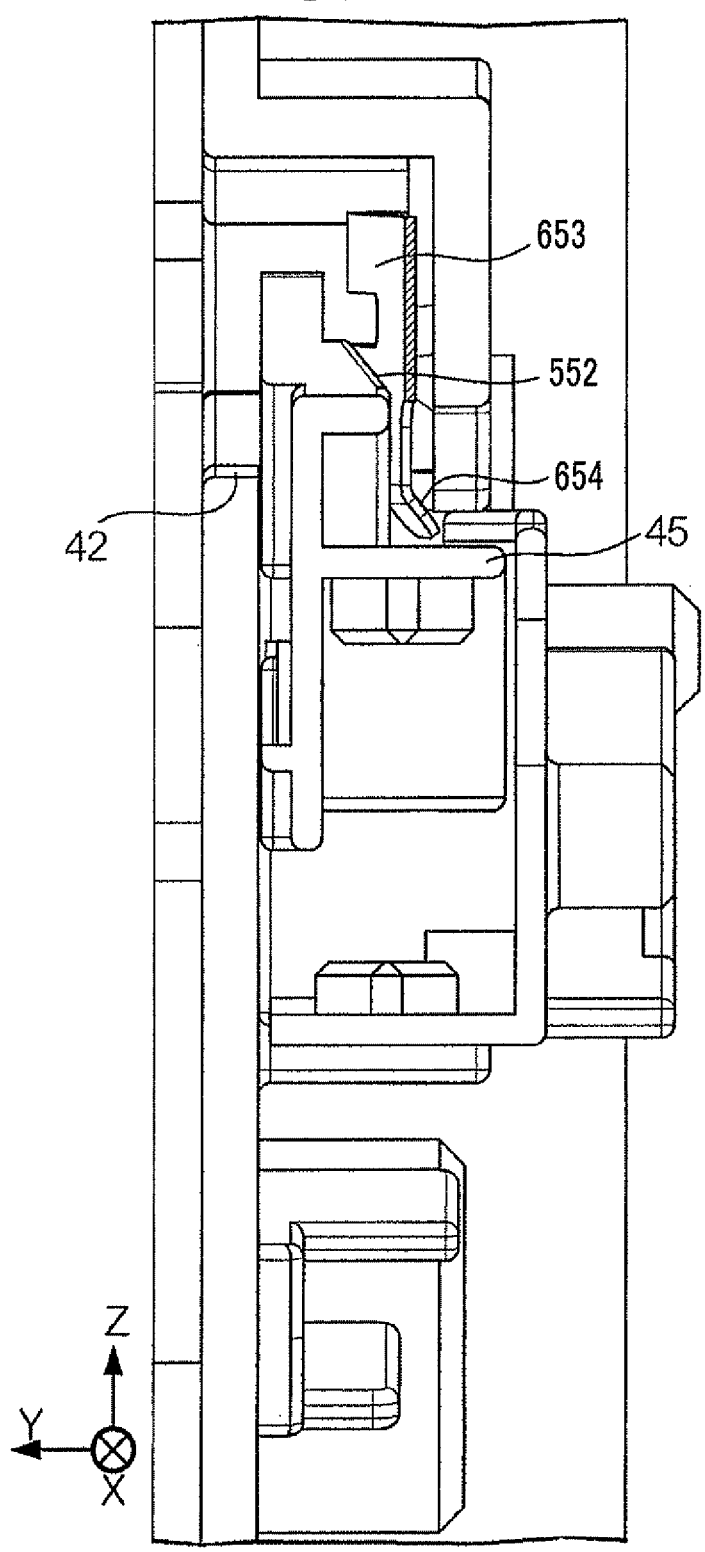
FIG. 24 is a view illustrating a state in which an opening and closing portion is closed.

FIG. 24 is a view illustrating a state in which the opening and closing portion 43 is closed with the bearing 112 is removed from the bearing support portion 42. The contact member 45 is positioned at the first position. The ground electrode 650 is pushed back in the direction away from the bearing support portion 42.

According to the second exemplary embodiment, the contact member 45 and the ground electrode 650 do not interrupt each other when the photoreceptor 11 is removed. That is, the second exemplary embodiment is configured such that the opening and closing portion 43 is closed with the photoreceptor 11 removed.

Moreover, in the second exemplary embodiment, since the contact member 45 performs the two functions of positioning the bearing 112 and pushing back the ground electrode 650, the number of components decreases as compared to a configuration in which these functions are realized by separate components.

Moreover, in the second exemplary embodiment, since the bearing 112 is supported at three points in the circumferential direction of the bearing 112, the bearing 112 is accurately positioned as compared to a case where such a configuration is not present.

Second Modification Example

The second exemplary embodiment may be modified like a modification example described later. Moreover, the second exemplary embodiment and the second modification example may be combined. Moreover, plural modification examples may be combined.

In the second exemplary embodiment, although an example in which both the electrode contacting portion 552 of the contact member 45 and the contacting portion 654 of the ground electrode 650 are formed to be inclined in relation to the second direction has been described, any one of the electrode contacting portion 552 and the contacting portion 654 may be formed to be inclined in relation to the second direction. Moreover, the electrode contacting portion 552 and the contacting portion 654 may be a curved surface. In short, it is sufficient that when the contact member 45 is moved in the direction opposite to the second direction, the ground electrode 650 is pushed back in the direction away from the bearing support portion 42 with the electrode contacting portion 552 and the contacting portion 654 making frictional contact with each other.

In the second exemplary embodiment, although an example in which the fixing portion 651 of the ground electrode 650 is fixed to the housing 40 by screws or the like, and the rotating shaft contacting portion 653 is pressed against the end surface of the rotating shaft 111 by the restoring force of the rotating shaft contacting portion 653 itself has been described, a configuration in which the fixing portion 651 is configured as a hinge, for example, and a spring that generates a restoring force in the direction of opening the hinge is provided may be employed.

In the second exemplary embodiment, although the photoreceptor 11 has been described as an example of a rotating member, the invention may be applied as a supporting mechanism for a bearing of the rotating shaft of a developing roller, a roller-type charging device, a roller-type transfer device, or the like, for example.

In the second exemplary embodiment, although an example in which the photoreceptor 11 is solely replaced has been described, the invention may be applied to an image forming apparatus that uses a cartridge in which at least one constituent component that is provided around the photoreceptor 11, such as the charging unit 12, the developing unit 14, or a removal unit that removes toner remaining in the photoreceptor 11 is integrated with the photoreceptor 11.

In the second exemplary embodiment, although an example in which the positioning of the bearing 112 is realized by supporting three points in the circumferential direction of the bearing 112 has been described, a bearing support portion having a curved surface corresponding to the outer circumferential surface of the bearing 112 may be formed, for example.

In the second exemplary embodiment, although an example in which the movement of the contact member 45 is realized concurrently with the opening and closing of the opening and closing portion 43 has been described, the user may operate the contact member 45 rather than providing the link mechanism 44, for example.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A supporting mechanism comprising:
   a bearing support portion that supports a bearing and is open so that the bearing is removed in a first direction that crosses a rotating shaft that is supported by the bearing;
   a driving shaft coupling that transmits a driving force to the rotating shaft by being connected to a rotating shaft coupling that is provided at one end of the rotating shaft; and
   a contact member that includes a bearing contact portion that makes contact with the bearing, wherein
   the bearing contact portion makes contact with the bearing so as to restrict movement of the bearing in the first direction when the contact member is positioned at a first position, and is separated from the bearing so as not to restrict the movement of the bearing in the first direction when the contact member is moved from the first position in a second direction that crosses the rotating shaft, and
   the driving shaft coupling is pushed out toward the rotating shaft coupling so as to be connected to the rotating shaft coupling when the contact member is positioned at the first position, and is pulled back so as to be separated from the rotating shaft coupling when the contact member is moved from the first position in the second direction.

2. The supporting mechanism according to claim 1, further comprising:
   a housing that stores the supporting mechanism and a rotating member having the rotating shaft;
   an opening and closing portion that is provided so that one surface of the housing is opened and closed; and
   a link mechanism that positions the contact member at the first position when the opening and closing portion is closed and moves the contact member from the first position in the second direction when the opening and closing portion is opened.

3. The supporting mechanism according to claim 2, further comprising:
   an extruding portion that connects the driving shaft coupling to the rotating shaft coupling by extruding the driving shaft coupling toward the rotating shaft coupling in a state of being connected to a driving source; and
   a driving shaft coupling contacting portion that is provided in the contact member so as to make contact with the driving shaft coupling, wherein
   the driving shaft coupling is pushed out toward the rotating shaft coupling by the extruding portion so as to be connected to the rotating shaft coupling when the contact member is positioned at the first position, and is pulled back by the driving shaft coupling contacting portion so as to be separated from the rotating shaft coupling when the contact member is moved from the first position in the second direction.

4. The supporting mechanism according to claim 3, wherein
   a flange is formed on an outer circumferential surface of the driving shaft coupling, and
   the driving shaft coupling contacting portion makes contact with the flange from the side of the rotating shaft coupling and is provided to be inclined in relation to the second direction so that the driving shaft coupling is pulled back in a direction of being separated from the rotating shaft coupling as the contact member moves in the second direction.

5. The supporting mechanism according to claim 3, wherein
   the bearing support portion supports the bearing by making contact with an outer circumferential surface of the bearing at two points in the circumferential direction of the bearing, and
   the bearing contact portion restricts the movement of the bearing in the first direction by making contact with the outer circumferential surface of the bearing at one point in the circumferential direction of the bearing.

6. The supporting mechanism according to claim 2, wherein
   a flange is formed on an outer circumferential surface of the driving shaft coupling, and
   the driving shaft coupling contacting portion makes contact with the flange from the side of the rotating shaft coupling and is provided to be inclined in relation to the second direction so that the driving shaft coupling is pulled back in a direction of being separated from the rotating shaft coupling as the contact member moves in the second direction.

7. The supporting mechanism according to claim 6, wherein
   the bearing support portion supports the bearing by making contact with an outer circumferential surface of the bearing at two points in the circumferential direction of the bearing, and
   the bearing contact portion restricts the movement of the bearing in the first direction by making contact with the outer circumferential surface of the bearing at one point in the circumferential direction of the bearing.

8. The supporting mechanism according to claim 2, wherein
   the bearing support portion supports the bearing by making contact with an outer circumferential surface of the bearing at two points in the circumferential direction of the bearing, and
   the bearing contact portion restricts the movement of the bearing in the first direction by making contact with the outer circumferential surface of the bearing at one point in the circumferential direction of the bearing.

9. The supporting mechanism according to claim 1, further comprising:
   an extruding portion that connects the driving shaft coupling to the rotating shaft coupling by extruding the driving shaft coupling toward the rotating shaft coupling in a state of being connected to a driving source; and
   a driving shaft coupling contacting portion that is provided in the contact member so as to make contact with the driving shaft coupling, wherein
   the driving shaft coupling is pushed out toward the rotating shaft coupling by the extruding portion so as to be connected to the rotating shaft coupling when the contact member is positioned at the first position, and is pulled back by the driving shaft coupling contacting portion so as to be separated from the rotating shaft coupling when the contact member is moved from the first position in the second direction.

10. The supporting mechanism according to claim 9, wherein
    a flange is formed on an outer circumferential surface of the driving shaft coupling, and
    the driving shaft coupling contacting portion makes contact with the flange from the side of the rotating shaft coupling and is provided to be inclined in relation to the second direction so that the driving shaft coupling is pulled back in a direction of being separated from the rotating shaft coupling as the contact member moves in the second direction.

11. The supporting mechanism according to claim 9, wherein
    the bearing support portion supports the bearing by making contact with an outer circumferential surface of the bearing at two points in the circumferential direction of the bearing, and
    the bearing contact portion restricts the movement of the bearing in the first direction by making contact with the outer circumferential surface of the bearing at one point in the circumferential direction of the bearing.

12. The supporting mechanism according to claim 1, wherein
    a flange is formed on an outer circumferential surface of the driving shaft coupling, and
    the driving shaft coupling contacting portion makes contact with the flange from the side of the rotating shaft coupling and is provided to be inclined in relation to the second direction so that the driving shaft coupling is pulled back in a direction of being separated from the rotating shaft coupling as the contact member moves in the second direction.

13. The supporting mechanism according to claim 12, wherein
    the bearing support portion supports the bearing by making contact with an outer circumferential surface of the bearing at two points in the circumferential direction of the bearing, and
    the bearing contact portion restricts the movement of the bearing in the first direction by making contact with the outer circumferential surface of the bearing at one point in the circumferential direction of the bearing.

14. The supporting mechanism according to claim 1, wherein
    the bearing support portion supports the bearing by making contact with an outer circumferential surface of the bearing at two points in the circumferential direction of the bearing, and
    the bearing contact portion restricts the movement of the bearing in the first direction by making contact with the outer circumferential surface of the bearing at one point in the circumferential direction of the bearing.

15. An image forming apparatus comprising:
    the supporting mechanism according to claim 1;
    a driving source that transmits a driving force to the driving shaft coupling;
    an image holding member;
    a bearing that supports a rotating shaft of the image holding member and is supported by the bearing support portion;
    a rotating shaft coupling that is provided at one end of the rotating shaft;
    an image forming unit that forms an image on the image holding member; and
    a transfer unit that transfers the image formed on the image holding member to a recording medium.

* * * * *